(12) United States Patent
Tenny et al.

(10) Patent No.: US 9,265,028 B2
(45) Date of Patent: Feb. 16, 2016

(54) MULTICAST/BROADCAST REPORTING FOR WIRELESS NETWORKS

(75) Inventors: Nathan E. Tenny, Poway, CA (US); Lorenzo Cassaccia, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 2348 days.

(21) Appl. No.: 11/765,994

(22) Filed: Jun. 20, 2007

(65) Prior Publication Data

US 2008/0019307 A1 Jan. 24, 2008

Related U.S. Application Data

(63) Continuation-in-part of application No. 11/760,645, filed on Jun. 8, 2007.

(60) Provisional application No. 60/815,298, filed on Jun. 20, 2006, provisional application No. 60/812,248, filed on Jun. 9, 2006.

(51) Int. Cl.
*H04W 4/00* (2009.01)
*H04W 72/00* (2009.01)

(52) U.S. Cl.
CPC .................................. *H04W 72/005* (2013.01)

(58) Field of Classification Search
USPC ............. 370/329, 431, 443; 455/69, 450, 509
See application file for complete search history.

(56) References Cited

U.S. PATENT DOCUMENTS

| | | | |
|---|---|---|---|
| 5,838,668 | A | 11/1998 | Okada et al. |
| 6,307,846 | B1 | 10/2001 | Willey |
| 6,393,003 | B1 | 5/2002 | Lee |
| 6,546,251 | B1 | 4/2003 | Dalsgaard et al. |
| 6,987,749 | B2 | 1/2006 | Cai et al. |

(Continued)

FOREIGN PATENT DOCUMENTS

| | | |
|---|---|---|
| EP | 1387591 A1 | 2/2004 |
| JP | 8340351 A | 12/1996 |

(Continued)

OTHER PUBLICATIONS

Written Opinion, PCT/US2007/071702, International Searching Authority, European Patent Office, Nov. 22, 2007.

(Continued)

*Primary Examiner* — German J Viana Di Prisco
(74) *Attorney, Agent, or Firm* — Liem T. Do

(57) ABSTRACT

Facilitating feedback to a third generation partnership project (3GPP) long term evolution (LTE) or subsequent network is described herein. By way of example one or more blocks of downlink transmission resources (e.g., downlink channel) can be correlated to one or more blocks of uplink transmission resources (e.g., uplink channel) during scheduling of a transmission allocation period. For instance, the correlation can identify to terminal devices a particular uplink channel that can be used to transmit, among other things, a negative acknowledgement (NACK) related to a particular downlink channel. Additionally, multiple uplink resources can be employed to facilitate a quantitative and/or qualitative determination of severity of data loss. Furthermore, a limiting factor can reduce a number of terminal devices responding to lost data simultaneously, reducing feedback interference. As described, the subject innovation can provide for dynamic and/or static feedback in LTE networks to ensure robust service transmissions for such networks.

70 Claims, 15 Drawing Sheets

(56) References Cited

U.S. PATENT DOCUMENTS

| | | | |
|---|---|---|---|
| 7,372,831 B2 | 5/2008 | Kim et al. | |
| 8,102,926 B2 | 1/2012 | Mantravadi et al. | |
| 8,477,673 B2 | 7/2013 | Casaccia et al. | |
| 2001/0026560 A1* | 10/2001 | Bellier et al. | 370/477 |
| 2002/0055360 A1* | 5/2002 | Chen et al. | 455/452 |
| 2003/0012195 A1* | 1/2003 | Ohkubo et al. | 370/329 |
| 2004/0087320 A1 | 5/2004 | Kim et al. | |
| 2005/0053035 A1 | 3/2005 | Kwak et al. | |
| 2005/0250497 A1* | 11/2005 | Ghosh et al. | 455/436 |
| 2006/0198325 A1* | 9/2006 | Gao et al. | 370/270 |
| 2007/0086370 A1* | 4/2007 | Jang et al. | 370/329 |
| 2009/0047912 A1* | 2/2009 | Lee et al. | 455/69 |

FOREIGN PATENT DOCUMENTS

| | | |
|---|---|---|
| JP | 2004511127 A | 4/2004 |
| JP | 2007500483 A | 1/2007 |
| RU | 2003132424 | 4/2005 |
| RU | 2262196 | 10/2005 |
| WO | WO-0227989 A1 | 4/2002 |
| WO | 2004042963 | 5/2004 |
| WO | 2005018144 | 2/2005 |
| WO | 2005046125 | 5/2005 |
| WO | 2005112328 | 11/2005 |

OTHER PUBLICATIONS

International Preliminary Report on Patentability, PCT/US2007/071702, The International Bureau of WIPO, Geneva Switzerland, Dec. 22, 2008.

International Search Report—PCT/US07/071702, International Search Authority—European Patent Office—Nov. 22, 2007.

Santella, et al.: "Single Frequency Network (SFN) Planning for Digital Terrestrial Television and Radio Broadcast Services: The Italian Frequency Plan for T-DAB" IEEE Vehicular Technology Conference in Milan, Italy, vol. 4, May 17, 2004-May 19, 2004 pp. 2307-2311, XP0107765570, Piscataway, USA, ISBN: 0-7803-8255-2, Section I.

3GPP TR 25.814 v1.4.0, (May 2006), "3rd Generation Partnership Project; Technical Specification Group Radio Access Network; Physical Layer Aspects for EVolved UTRA (Release 7)", pp. 1-121.

3GPP TSG-RAN WG1 #42, "Channel Structure for E-UTRA MBMS Evaluation" R1-050901, Aug. 29-Sep. 2, 2005, pp. 1-4.

Taiwan Search Report—TW096122238—TIPO—Mar. 1, 2012.

\* cited by examiner

MULTICAST/BROADCAST REPORTING FOR WIRELESS NETWORKS

CROSS-REFERENCE TO RELATED APPLICATIONS

This application claims the benefit of U.S. Provisional Patent application Ser. No. 60/815,298 entitled "A METHOD AND APPARATUS FOR MBMS REPORTING LTE" which was filed Jun. 20, 2006, and is a continuation-in-part of U.S. Non-Provisional Patent application Ser. No. 11/760,645 entitled "CELL SPECIFIC RETRANSMISSION OF SINGLE FREQUENCY NETWORK MBMS DATA" which was filed Jun. 8, 2007 and which claims the benefit of U.S. Provisional Patent application Ser. No. 60/812,248 filed on Jun. 9, 2006 entitled "METHOD AND APPARATUS FOR RETRANSMISSION IN WIRELESS COMMUNICATIONS". The entirety of the aforementioned applications is herein incorporated by reference.

BACKGROUND

I. Field

The following description relates generally to wireless communications, and more particularly to providing feedback for LTE networks to indicate un-received or indecipherable blocks of transmission data.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power,). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating feedback to a third generation partnership project (3GPP) long term evolution (LTE) network indicating whether transmission data provided by such network is not received or received but indecipherable. One or more blocks of downlink transmission resources (e.g., downlink channel) can be correlated to one or more blocks of uplink transmission resources (e.g., uplink channel) during scheduling of a transmission allocation period. The correlation can identify to terminal devices a particular uplink channel that can be used to transmit, among other things, a negative acknowledgement (NACK) related to a particular downlink channel. Additionally, multiple uplink resources can be employed to facilitate a quantitative and/or qualitative determination of severity of data loss. Furthermore, a limiting factor can be transmitted to reduce a number of terminal devices responding to lost data simultaneously, to reduce potential interference. As described, the subject innovation provides for dynamic and/or static feedback in LTE networks.

According to related aspects, a method for providing feedback to a wireless 3GPP LTE communication network is described herein. The method can comprise scheduling a correlation between a block of downlink transmission resources and a block of uplink transmission resources for an allocation period at least partly associated with a multicast or broadcast service. Further, the method may comprise transmitting the scheduled correlation to a plurality of terminal devices, and receiving a feedback message related to the block of downlink transmission resources from at least one of the plurality of terminal devices via the block of uplink transmission resources.

Yet another aspect relates to an apparatus that provides feedback for a 3GPP LTE wireless network. The apparatus can comprise a means for scheduling a correlation during an allocation period between a block of downlink transmission resources and a block of uplink transmission resources for a multicast or broadcast service. Additionally, the apparatus can comprise a means for transmitting the scheduled correlation via the multicast or broadcast service to a plurality of terminal devices. Furthermore, the apparatus can also comprise a means for receiving a feedback message related to the block of downlink transmission resources from at least one of the plurality of terminal devices via the block of uplink transmission resources.

Another aspect relates to an apparatus that facilitates transmission of feedback to a 3GPP LTE network. The apparatus can comprise an association processor that schedules a correlation during an allocation period between a block of downlink transmission resources and a block of uplink transmission resources for a multicast or broadcast service. Further, the apparatus can comprise a transmitter that broadcasts the scheduled correlation to a plurality of terminal devices. The apparatus can also comprise an antenna that receives a feedback message related to the block of downlink transmission resources from at least one of the plurality of terminal devices via the block of uplink transmission resources.

A further aspect relates to a processor that facilitates feedback to a 3GPP LTE network. The processor can comprise a means for scheduling a correlation between a block of downlink transmission resources and a block of uplink transmission resources for an allocation period at least partially associated with a multicast or broadcast service. Additionally, the processor can comprise a means for transmitting the scheduled correlation to a plurality of terminal devices, and a means for receiving a feedback message related to the block of downlink transmission resources from at least one of the plurality of terminal devices via the block of uplink transmission resources.

Still another aspect relates to a computer program product that facilitates feedback for 3GPP LTE networks. The computer program product can comprise codes executable by at least one computer to schedule a correlation between a block of downlink transmission resources and a block of uplink transmission resources, transmit the scheduled correlation, and receive a feedback message related to the block of downlink transmission resources. Additionally, the correlation can be scheduled for a particular allocation period transmitting a multicast or broadcast service via the block of downlink transmission resources. Further, the feedback message can be received from at last one of a plurality of terminal devices via the block of uplink transmission resources.

Another aspect relates to a method for providing feedback to a wireless 3GPP LTE communication network. The method can comprise receiving a transmission service schedule that defines services apportioned to one or more blocks of a transmission allocation period, and receiving a scheduled correlation between a block of downlink transmission resources and a block of uplink transmission resources related to a multicast or broadcast service scheduled for the allocation period. The method can also comprise providing a feedback message via the block of uplink transmission resources indicating that at least a portion of the block of downlink transmission resources, or data associated therewith, is not received.

Yet another aspect relates to an apparatus that provides feedback to a wireless 3GPP LTE network. The apparatus can comprise a means for receiving a transmission service schedule that defines services apportioned to one or more blocks of a transmission allocation period, and a means for receiving a scheduled correlation between a block of downlink transmission resources and a block of uplink transmission resources related to a multicast or broadcast service scheduled for the allocation period. The apparatus can additionally comprise a means for providing a feedback message via the block of uplink transmission resources indicating that at least a portion of the block of downlink transmission resources, or data associated therewith, is not received.

Still another aspect relates to an additional apparatus for providing feedback to a wireless 3GPP LTE network. Such apparatus can comprise an antenna that receives a service schedule defining services apportioned to one or more blocks of a transmission allocation period, and a scheduled correlation between a block of downlink transmission resources and a block of uplink transmission resources related to a multicast or broadcast service scheduled for the allocation period. Further, the apparatus can comprise a transmitter that provides a feedback message via the block of uplink transmission resources to an eNode B, indicating that at least a portion of the block of downlink transmission resources, or data associated therewith, is not received.

Another aspect relates to a processor that provides feedback to a wireless 3GPP LTE communication network. The processor can comprise a means for receiving a transmission service schedule that defines services apportioned to one or more blocks of a transmission allocation period, and a means for receiving a scheduled correlation between a block of downlink transmission resources and a block of uplink transmission resources related to a multicast or broadcast service scheduled for the allocation period. Furthermore, the processor can comprise a means for providing a feedback message via the block of uplink transmission resources indicating that at least a portion of the block of downlink transmission resources, or data associated therewith, is not received.

A further aspect relates to a computer program product that provides feedback to 3GPP LTE networks. The computer program product can comprise codes executable by at least one computer to receive a transmission service schedule that defines services apportioned to blocks of an allocation period, receive a scheduled correlation between a block of downlink transmission resources and a block of uplink transmission resources, and provide a feedback message via the block of uplink transmission resources. Additionally, the feedback message can indicate that at least a portion of the block of downlink transmission resources, or data associated therewith, is not received. Also, the transmission resources can be related to a multicast or broadcast service scheduled for transmission within the allocation period.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
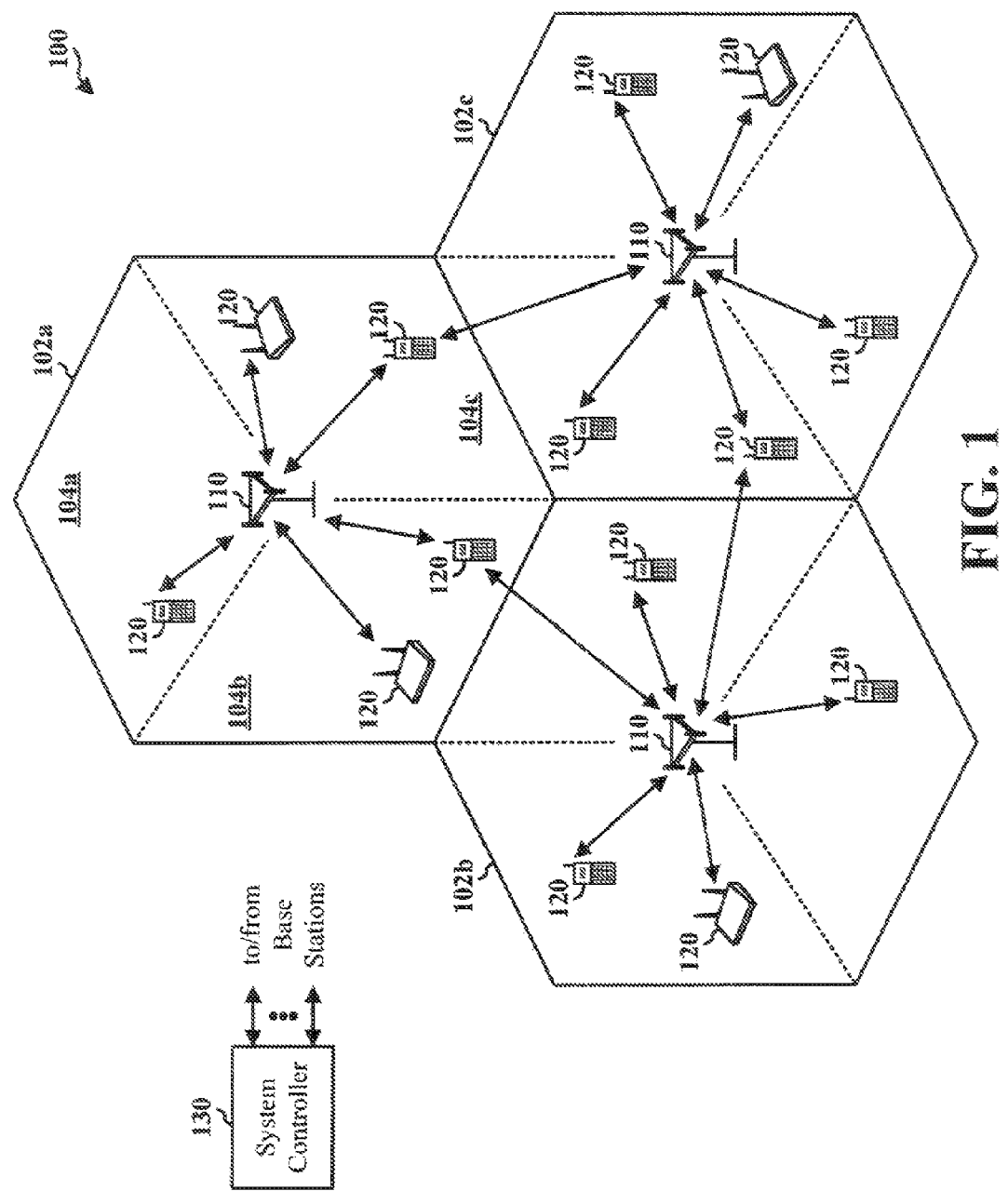
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of an ad-hoc or unplanned/semi-planned deployed wireless communication environment that provides synchronized transmission and retransmission of SFN data. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
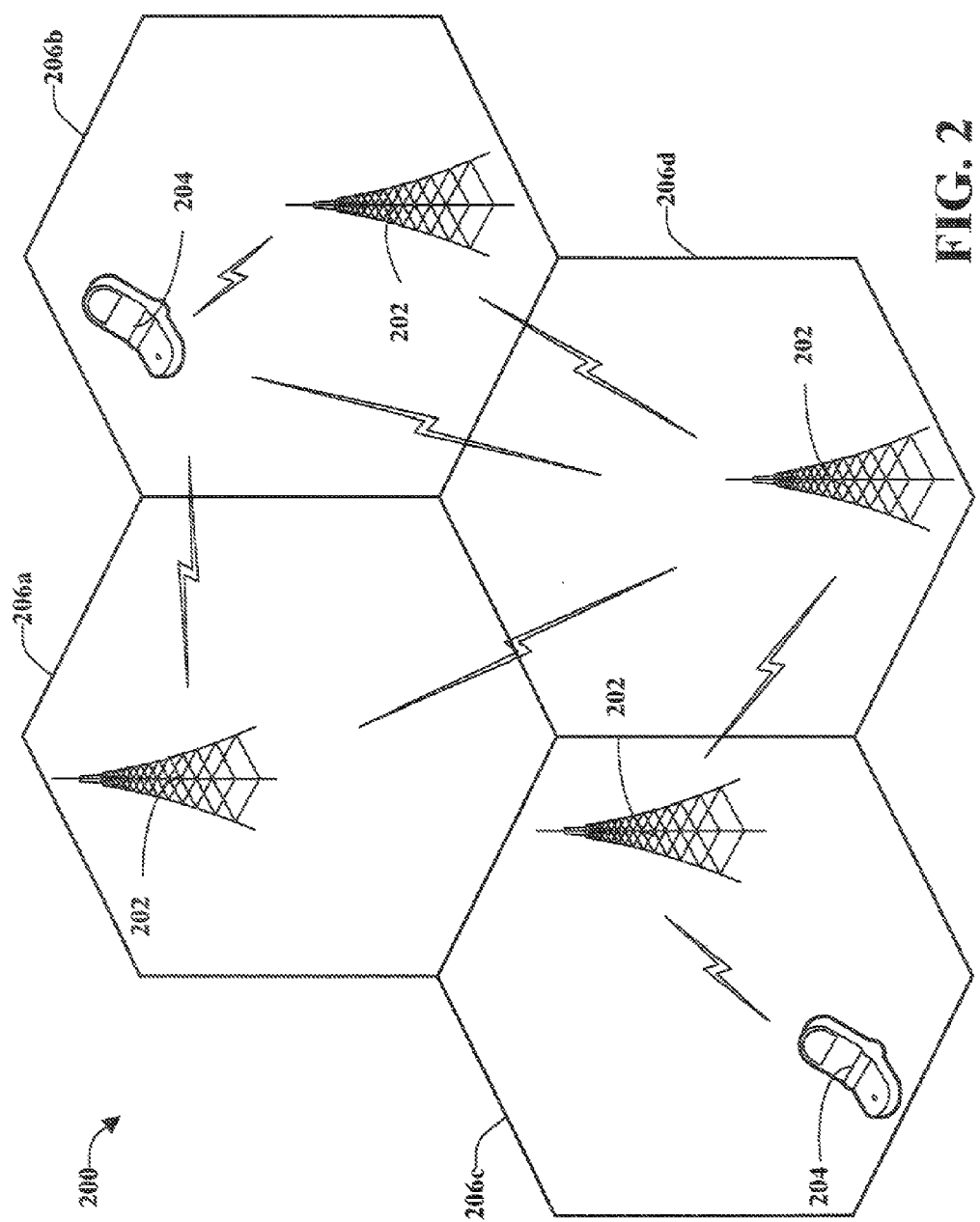
FIG. 2 depicts an example communications apparatus for employment with a wireless communications environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 may be, for example, cellular phones, smart phones, laptops, hand-held communication devices, handheld computing devices, satellite radios, global positioning systems, PDAs, and/or any other suitable device for communicating over wireless network 200. System 200 can be employed in conjunction with various aspects described herein in order to facilitate providing feedback to a wireless communication environment, as set forth with regard to subsequent figures.

Referring to FIGS. 3-7, methodologies relating to facilitating provision of feedback to third generation partnership project (3GPP) long term evolution (LTE) networks are depicted. For example, the methodologies can relate to providing such feedback in a frequency division multiple access (FDMA) environment, an orthogonal frequency division multiple access (OFDMA) environment, a code division multiple access (CDMA) environment, a wideband code division multiple access (WCDMA) environment, a time division multiple access (TDMA) environment, a space-division multiple access (SDMA) environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 3:
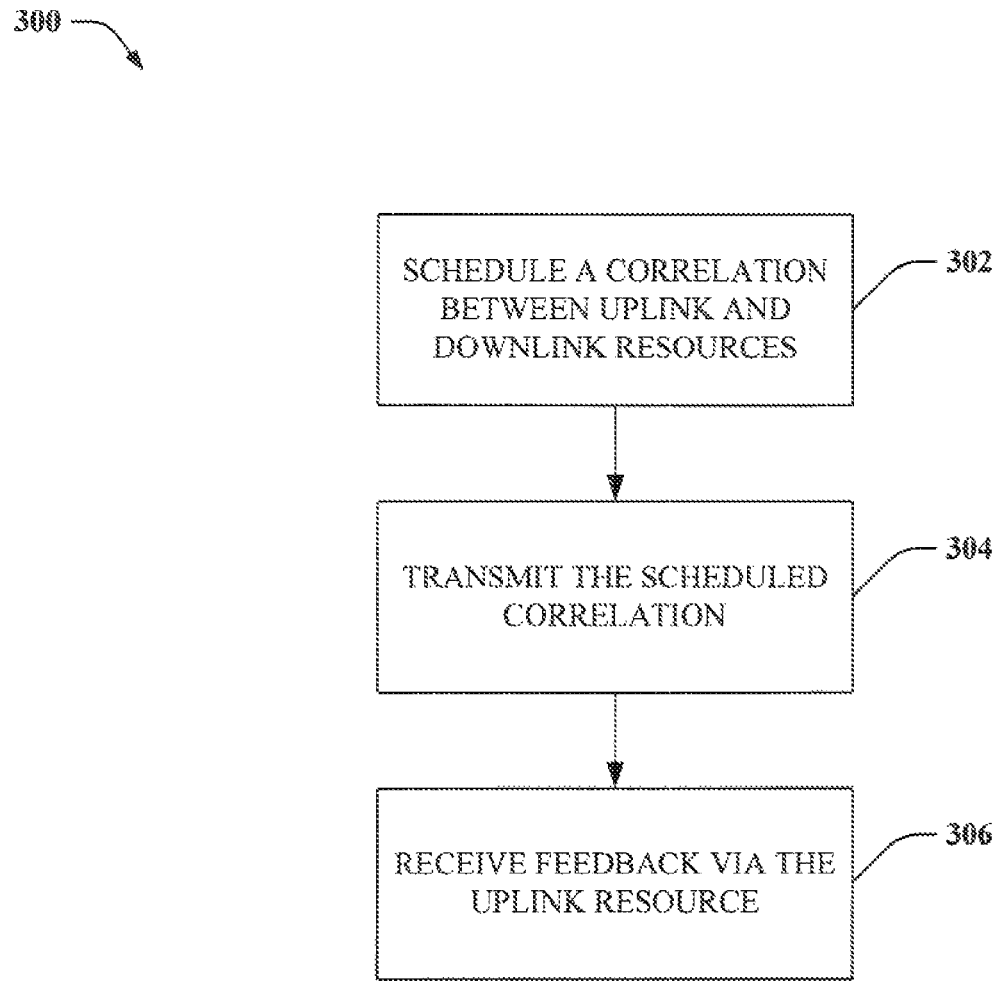
FIG. 3 illustrates a sample methodology for providing feedback to a wireless communications network.

FIG. 3 is a depiction of an example methodology 300 for providing feedback to a wireless communications network. Method 300 can facilitate providing feedback from one or more terminal devices to components of a wireless communication network, such as a base station transmitter (e.g., an enhanced Node base station, eNode B, or like mechanism). For instance, blocks of downlink transmission resources (e.g., downlink channel) can be scheduled to correlate with blocks of uplink transmission resources (e.g., uplink channel) for a particular allocation period. Additionally, services transmitted by the wireless network can be apportioned to the downlink transmissions. If a service, apportioned to a particular downlink channel is not received, a device can use the uplink channel correlated to that downlink channel for the allocation period to indicate such an occurrence. As a result, a network can determine what block of transmission resources is missed, and consequently can initiate retransmission, by the scheduled correlation between the uplink and downlink resources for the allocation period.

According to method 300, at 302, a correlation between uplink and downlink resources is scheduled. As a specific example, the correlation can be between a block of downlink transmission resources and a block of uplink transmission resources for an allocation period at least partly associated with a multicast or broadcast service. For instance, the multicast and/or broadcast service can be allocated to the block of downlink transmission resources during the allocation period. As a result, the correlation can identify a particular uplink channel to be utilized if the multicast and/or broadcast service, allocated to the block of downlink transmission resources, is not received.

At 304, the scheduled correlation can be transmitted. For instance, the correlation can be broadcast to terminal devices having a contemporaneous link with an eNode B. Such correlation can also be provided by an ad hoc network, a wired communication network, or can be included on a computer readable medium loaded onto one or more terminal devices. At 306, feedback is received via the uplink resource. It should be appreciated that feedback received by a particular uplink resource can identify a related downlink resource (e.g., the block of downlink transmission resources, or multiple blocks, or the like) by virtue of the correlation between the uplink and downlink resources at reference number 302.

It should also be appreciated that a scheduled correlation, as described herein, can imply a failure to properly receive a service (e.g., the multicast and/or broadcast service) transmitted via the identified downlink resource, if the correlation is dedicated to providing feedback regarding failure to receive a transmission. In addition, the feedback need not be deciphered by a communication network in accord with method 300 for the network to be able to identify a resource and infer a need to retransmit the resource; simply receiving a feedback message via the uplink resource can be sufficient to indicate such information. Moreover, the feedback message can include a negative acknowledgement (NACK) indicating that a block of downlink transmission resources was improperly received. As described, methodology 300 can facilitate transmission of feedback related to a failure to receive a block of transmission resources and/or corresponding data. As a result, services provided by a communication network can be offered in a more robust fashion, ensuring that such services are ultimately received by a terminal device.

Figure 4:
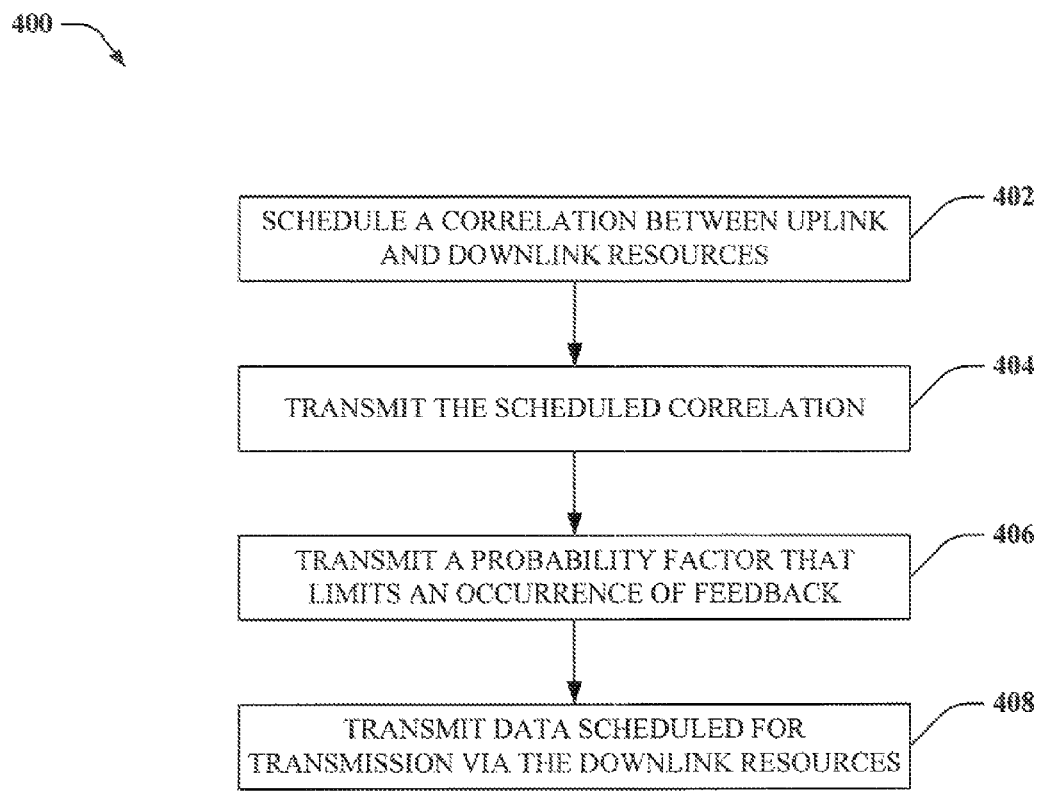
FIG. 4 illustrates an example methodology for limiting a number of devices responding to a lost transmission.

FIG. 4 illustrates an example methodology 400 for limiting a number of devices responding to a lost transmission. Particularly, methodology can facilitate a reduction of transmission interference regarding providing feedback for the lost transmission. For example, if many terminal devices fail to receive a block of transmission resources and/or associated data, as described herein, and simultaneously provide feedback regarding such resources and/or data, a significant amount of interference can be created. To control a level of interference, a number of terminal devices providing such feedback can be limited. Conventional mechanisms for limiting feedback have been imposed by explicitly assigning certain terminal devices to perform reporting functions. However, this approach can depend on an eNode B's (or, e.g., like transmitter) ability to identify devices that are receiving a service, which can further require special signaling on uplink resources as well as additional procedures. Additionally, management problems related to conventional mechanisms can result as terminal devices initiate and terminate a link with the eNode B (e.g., upon entering and leaving a cell serviced by the eNode B).

A related problem can occur with respect to feedback collisions. For instance, if uplink resources can accommodate four transmissions, and five terminal devices attempt to use them substantially simultaneously, at least one transmission will be lost due to a collision (e.g., attempting to transmit on a full channel, or the like). Method 400 can also reduce collisions by tailoring a probability factor to match a size of correlated uplink resources. Consequently, it can be less likely for feedback transmission to overfill uplink resources.

According to method 400, at 402, a correlation between uplink and downlink resources can be scheduled. For instance, the correlation can be between a block of downlink transmission resources and a block of uplink transmission resources for an allocation period at least partly associated with a multicast or broadcast service. Additionally, any suitable correlation mechanism described herein can be utilized at reference number 402 (e.g., see FIG. 7, infra). At 404, the scheduled correlation can be transmitted, for instance, to a plurality of terminal devices. As an example, such terminal devices can receive the transmission in order to identify one or more blocks of uplink transmission resources correlated to one or more blocks of downlink transmission resources, for providing feedback related to such downlink resources and/or data, for instance. For example, the scheduled correlation can identify an uplink channel utilized to send a NACK for a block of downlink transmission resources that was not received by a terminal device.

At 406, a probability factor can be transmitted that limits an occurrence of feedback. For example, an eNode B can provide the probability factor in conjunction with the scheduled correlation (e.g., on a block by block basis, or an allocation period basis, or the like). More specifically, the probability factor can provide a number in the range of 0 to 1 for one or more terminal devices. If a terminal device determines that it has failed to receive a block correctly, the terminal device can generate a random number between 0 and 1; if the generated number is less than (or, e.g., less than or equal, equal to, greater than, greater than or equal, etc.) the probability factor the terminal device can provide a feedback message related to the missed block, if not, no feedback message is provided by that terminal device (e.g., for that block, for an allocation period, or the like). As an additional example, the probability factor can be varied by an eNode B for a particular service. Specifically, the probability factor can be set at an initial value to determine a number of feedback messages received for the service at a point in time. Subsequently, the probability factor can be increased or decreased, as suitable, in order to adjust interference and avoid or mitigate collisions between transmissions from different terminal devices.

At 408, data scheduled for transmission via the downlink resources is transmitted. As described above, a failure to properly receive such data (e.g., as indicated by a transmission schedule provided at the outset of an allocation period) can cause a device to generate a random number, compare it to the probability factor, and transmit a feedback message (e.g., NACK) based on the comparison. As described, method 400 can facilitate dynamic reduction of interference related to network feedback messages, to improve reliability in receiving such messages.

Figure 5:
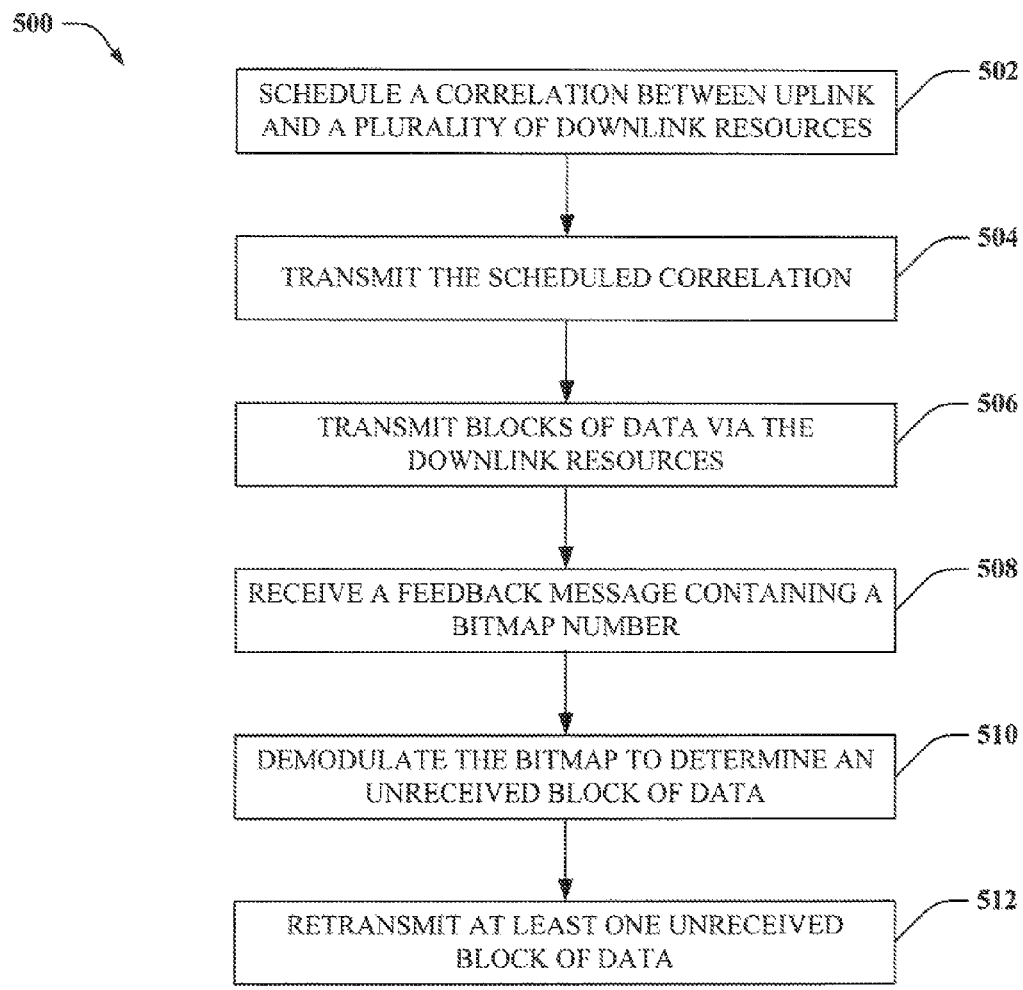
FIG. 5 depicts an example methodology for providing feedback for multiple blocks of downlink transmission resources in accordance with aspects disclosed herein.

FIG. 5 depicts an example methodology 500 for providing feedback for multiple blocks of downlink transmission resources in accordance with aspects disclosed herein. In accordance with various aspects of the subject disclosure set forth herein, a feedback message can contain content within it (e.g., a NACK, or the like, or block specific data, as indicated below) or no content. If it contains no content, an eNode B is informed at least of the fact that a particular downlink resource, correlated by allocation period scheduling to a particular uplink resource over which the feedback message was sent, was not properly received by at least one terminal device. Such information can trigger the eNode B or multiple eNode B's, to retransmit the downlink resource. It should also be appreciated that an eNode B would not need to demodulate such a message; identifying a non-baseline amount of energy therein can be sufficient to infer that a feedback message was sent (e.g., a baseline energy can be level 0 or 1, for instance, and an energy level in an uplink channel greater than the baseline can imply that a feedback message has been sent).

As an alternative to the above approach, a plurality of downlink resource blocks can be assigned to an uplink resource (e.g., one block of uplink transmission resources, or a particular group of such blocks, or the like). In such a case, a terminal device that missed at least one block of downlink data can transmit a bitmap via the uplink resource indicating, for instance, which blocks were received correctly and which blocks were received incorrectly. As a particular example, assume 5 blocks of downlink transmission resources, blocks A, B, C, D, and E, are correlated to a particular uplink resource during an allocation period. If a terminal device receives, for instance, blocks A, C, and E, but fails to receive blocks B and D, a bitmap containing the multi-digit binary number [01001] could indicate the received and un-received blocks, where 0 indicates a received block and 1 indicates an un-received block, in this instance. It should also be appreciated that various other example embodiments of numbers can be used to represent a dual state of a plurality of blocks of transmission resources, as described herein (e.g., where 0 indicates an un-received block and 1 indicates a received block, or where non-binary numbers are utilized to convey substantially similar information, or the like). Such other embodiments known in the art or made known to one of skill in the art by way of the context provided herein are incorporated into the subject application.

According to method 500, at 502, a correlation between an uplink resource and a plurality of downlink resources is scheduled (e.g., for a multicast or broadcast service during an allocation period). At 504, the scheduled correlation can be transmitted (e.g., to a plurality of terminal devices). At 506, blocks of data scheduled to the plurality of downlink resources can be transmitted (e.g., to the plurality of terminal devices and/or additional devices entering a cell). At 508, a feedback message containing a bitmap number can be received. Additionally, the bitmap number can be correlated to the plurality of downlink resources and configured to indicate whether each of such resources is received at a terminal device, as described above. At 510, the bitmap can be demodulated (e.g., at an access point, eNode B, or the like) to determine an un-received block of data. At 512, at least one un-received block of data can be retransmitted to devices in a cell or multiple cells.

As described, methodology 500 provides for limiting an amount of interference related to feedback messages by including information related to multiple downlink blocks by way of a single feedback message. It should be appreciated that providing a bitmap message as described can require an access point or eNode B to demodulate such a message in order to determine un-received downlink blocks. Additionally, interference between multiple feedback messages can hinder demodulation. Consequently, a mechanism for limiting interference, such as that described above at FIG. 4, can be employed in conjunction with method 500. As a particular example, a network could desire a low probability factor in conjunction with feedback requiring demodulation, to substantially reduce interference.

Figure 6:
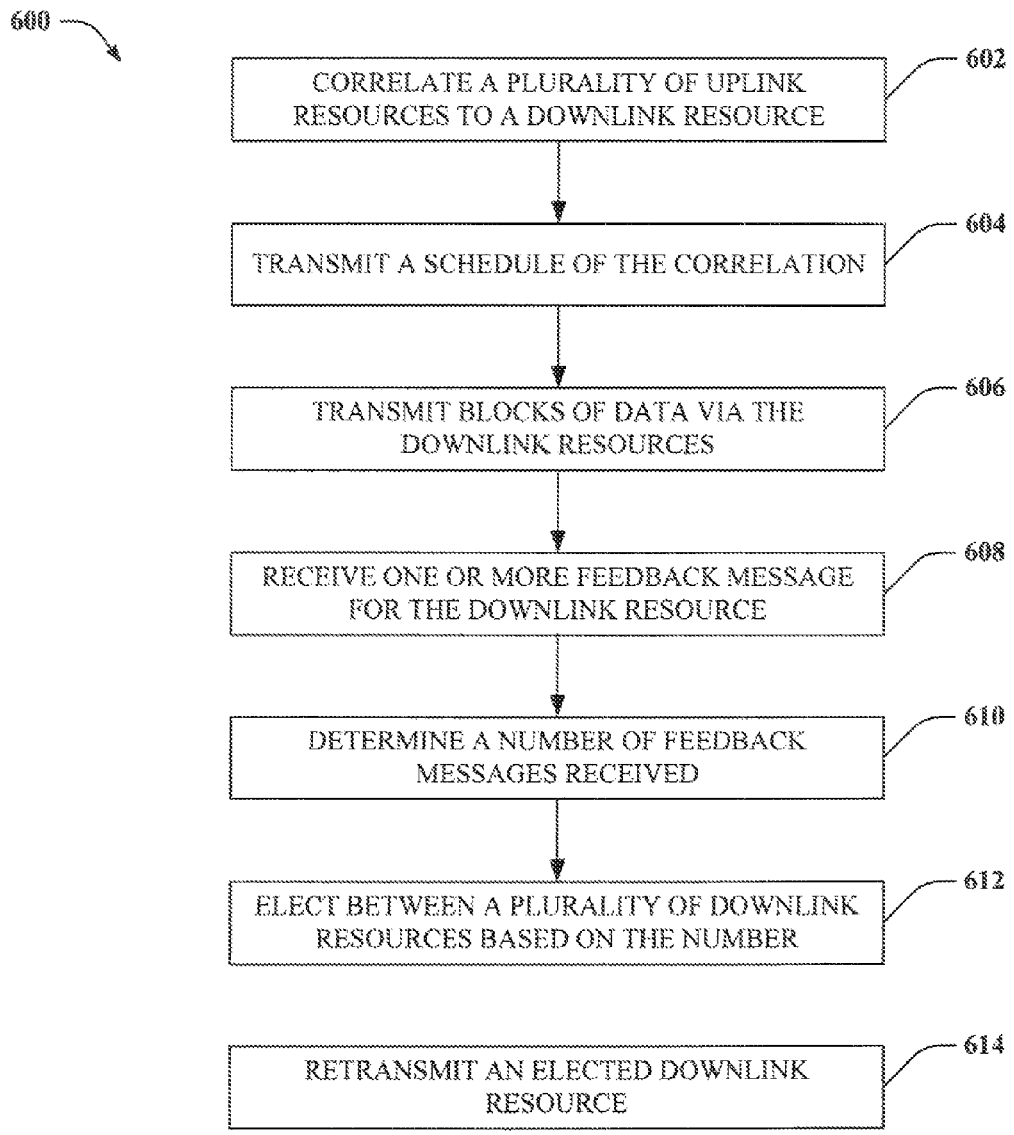
FIG. 6 illustrates an example methodology for selecting between un-received blocks of transmission resources for retransmission in accordance with one or more aspects.

FIG. 6 illustrates an example methodology for selecting between un-received blocks of transmission resources for retransmission in accordance with one or more aspects. In accordance with various aspects of the subject disclosure set forth herein, it can be relevant to distinguish between blocks of un-received downlink resources to determine which were un-received by a greater number of terminal devices. For instance, if retransmission bandwidth is limited, it can be desirable to re-transmit a block that was un-received by 10 devices as opposed to a block that was un-received by only one device, in order to provide robust service for a greater number of terminal devices.

According to method 600, at 602, a plurality of uplink resources is correlated to a downlink resource. As a specific example, a correlation can be scheduled between a first and one or more additional blocks of uplink transmission resources and a block of downlink transmission resources, such that the blocks of uplink transmission resources enable receipt of a plurality of feedback messages for the downlink block. For instance, if three uplink blocks are associated with a downlink block, up to three terminal devices can provide feedback to an LTE network that the downlink block had been un-received. If such is the case, the network can give retransmission priority at least in part based on a number of feedback messages received for a particular downlink block.

At 604, a schedule of the correlation can be transmitted. For instance, the correlation can be transmitted during an outset of an allocation period, when service and downlink resource allocation is transmitted to terminal devices. Alternatively, or in addition, the schedule for a block can be transmitted with a block, or with a related block. As a further example, a static function can define the correlation between uplink and downlink blocks, wherein such function is provided by the network prior to or contemporaneous with transmission of one or more blocks of downlink resources, or provided by an external network, manually loaded onto terminal devices, downloaded onto such devices, or the like.

At 606, blocks of data can be transmitted via the downlink resources. At 608, one or more feedback messages for the downlink block can be received. At 610, a number of feedback messages for the downlink block can be determined. At 612, an election between one or more of a plurality of downlink resources can be made based at least in part on the number of feedback messages received. At 614, one or more elected downlink resources can be retransmitted. Accordingly, system 600 enables a network to employ statistical techniques to determine which of multiple un-received downlink blocks should be retransmitted or retransmitted first in the event of limited retransmission resources.

It should be appreciated that terminal devices can respond to a plurality of uplink resources as described by methodology 600 in several ways. For instance, if a downlink block is un-received at a device, the device can randomly determine one or more of the correlated uplink resources for providing the feedback message. Random selection, however, can result in feedback collisions, where a plurality of devices attempt to utilize a single uplink block (e.g., with bandwidth large enough for only one feedback message), and one or more feedback messages go un-received by a network due to bandwidth limitations of the uplink block. Consequently, a network can direct particular devices to utilize a particular uplink resource of the correlated downlink block is un-received. For example, a hash function, based at least in part on an access class of a terminal device, an identity of a service utilized by a device, a hash of a device's identify, or block-specific information, or a combination thereof, can determine a particular uplink channel if a particular downlink block is un-received by the device. Such a hash function can be generated and transmitted with the scheduled correlation. As a result of the alternate example, multiple uplink resources are more likely to transmit an accurate demographic of devices that fail to receive a particular downlink block of data.

Figure 7:
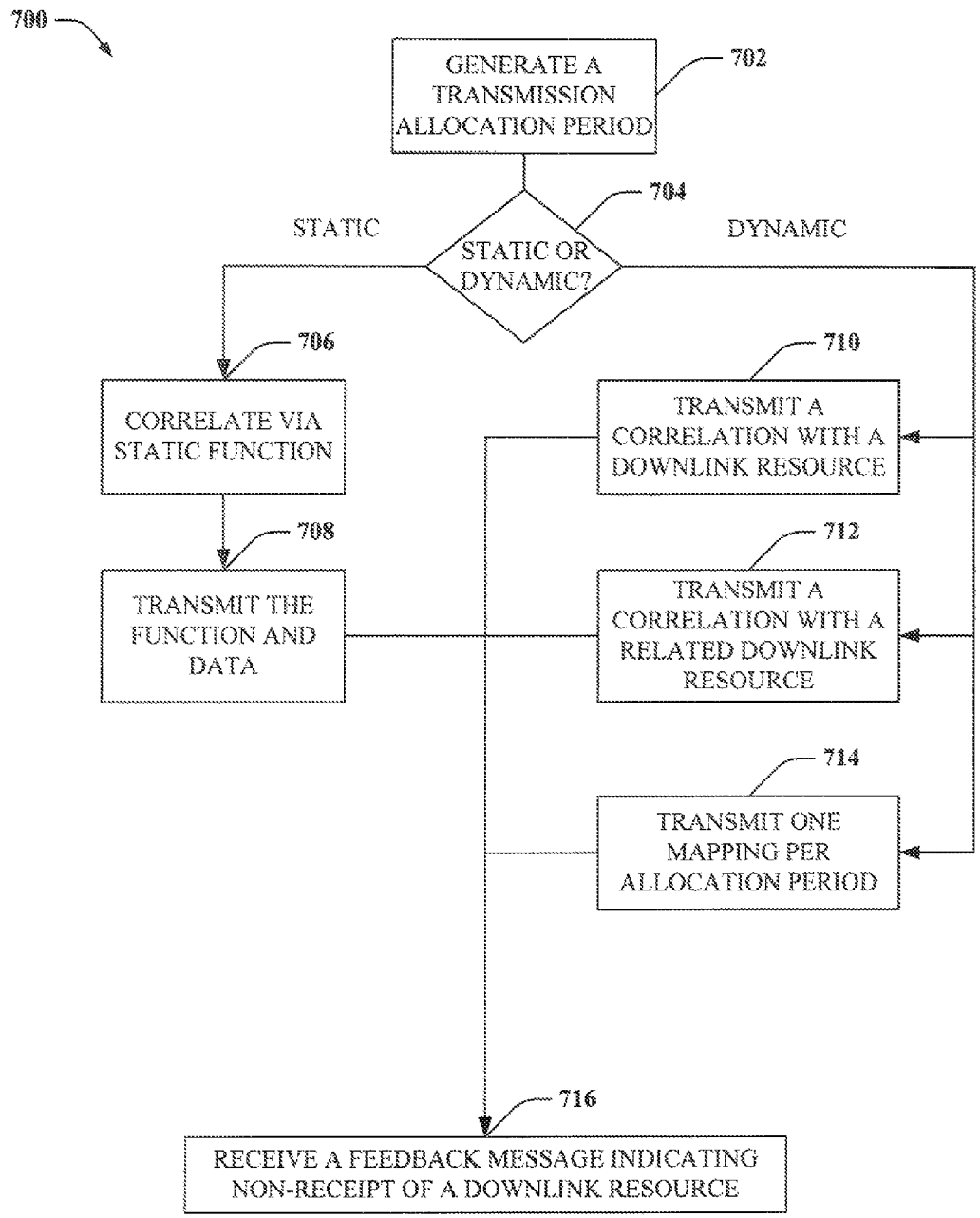
FIG. 7 depicts a sample methodology for correlating downlink and uplink resources in accordance with the claimed subject matter.

FIG. 7 depicts a sample methodology for correlating downlink and uplink resources in accordance with the claimed subject matter. In accordance with various aspects of the subject disclosure set forth herein, particular mechanisms for correlating uplink and downlink resources are disclosed. For instance, static correlation, establishing a set relationship between suitable downlink resources and suitable uplink resources for one or more allocation blocks can be employed. Alternatively, or in addition, dynamic correlation can be employed, that provides a particular correlation for each block of data as a function of a service allocated to the block, an allocation period transmitting the block, available uplink resources projected for the allocation period, or a combination thereof or of the like. Dynamic correlation can enable a network to update an assignment of feedback resources as network conditions vary, for instance.

According to method 700, at 702, a transmission allocation period can be generated. Such allocation period can include a scheduling that allocates particular data services to particular blocks of downlink transmission resources, transmitted upon execution of the allocation period. In addition, the scheduling can correlate one or more blocks of uplink transmission resources to be used by terminal devices to transmit feedback (e.g., NACK messages, ACK messages, or other pertinent information) for an un-received block of downlink resources. At 704, a determination is made as to whether a static or a dynamic correlation will be included within the allocation period.

To schedule a static correlation, methodology 700 proceeds to 706, where a static function can be utilized to associate one or more uplink blocks to one or more downlink blocks. For example, a function 'F', known to both an eNode B and to appropriate terminal devices (e.g., transmitted by the network, for instance at 708, transmitted and/or downloaded from a network, loaded manually, fixed in system specifications, or the like) can indicate a particular uplink resource 'F(x)' for a particular block of downlink resources 'x'. As a more specific example, if enhanced multimedia broadcast multicast services (E-MBMS) are strictly time-multiplexed within a downlink OFDM carrier, 'x' can be a sub-frame index within an E-MBMS scheduling period, and 'F(x)' can specify a particular frequency and transmission time interval (TTI) index for use in an single carrier frequency division multiple access (SC-FDMA) uplink. Methodology 700 can then proceed to 708, where the function and/or data scheduled within an allocation period can be transmitted by an LTE network.

To schedule a dynamic correlation, methodology can proceed from the determination at 704 to 710, 712, or 714. At 710, a dynamic correlation can be achieved by transmitting a correlation along with a downlink resource. The correlation can explicitly signal an uplink resource to be utilized if data within the downlink resource is not properly received. Moreover, an additional correlation can be transmitted for each subsequent (or, e.g., prior or contemporaneous) downlink resource to explicitly signal an associated uplink resource related thereto. As one example embodiment, the correlation can be carried in-band, in association with the data block transmitted with the downlink resource. Such an embodiment can require a terminal device to receive a downlink block (e.g., sub-frame) containing particular data for a scheduled service, before knowing where to send a corresponding feedback message. As a more particular example, descriptions of the uplink resources can be transmitted with support for error detection and/or correction separate from the downlink data block (e.g., separate CRCs), so that a terminal device can distinguish an error in the data block from an error in the scheduled correlation (or e.g., a like mapping of resources). In addition, such resource descriptions can be realized as a separate physical channel between the network and the terminal devices.

At 712, methodology 700 can transmit a correlation (e.g., between a first downlink block and an associated uplink block) with a related downlink resource. For example, a second block of transmission resources can contain a correlation to an uplink resource for a first block of transmission resources. Consequently, if the first block is un-received, it is more likely that the associated uplink block required to provide a feedback message for the first block can be identified (e.g., if the first block is not received, any correlation provided therein, for instance in-band, can also be lost) if that uplink block is specified in a second transmission resources (assuming, e.g., that the second block or at least the correlation are properly received).

At 714, methodology 700 can transmit one mapping per allocation period. Particularly, the mapping can indicate the uplink blocks associated with downlink blocks scheduled for that allocation period. Further, the mapping can be transmitted by the network along with the scheduling information that maps service data to one or more of the blocks of downlink resources in the allocation period. Such data can typically be transmitted at the outset of an allocation period (see, e.g., FIG. 10, for a depiction of scheduled mapping). In addition, a separate block or a separate channel can provide an uplink channel if a terminal device missed the scheduling information, enabling retransmission of the scheduling information as well. At 716, methodology 700 can receive a feedback message indicating non-receipt of a downlink resource, whether by a static or a dynamic correlation technique as described herein. As described, method 700 can provide various mechanisms for reporting to a network that certain data has been lost and should be retransmitted. Each of the described mechanisms, alone or in combination, can increase the integrity of services provided by an LTE network as described herein.

Figure 8:
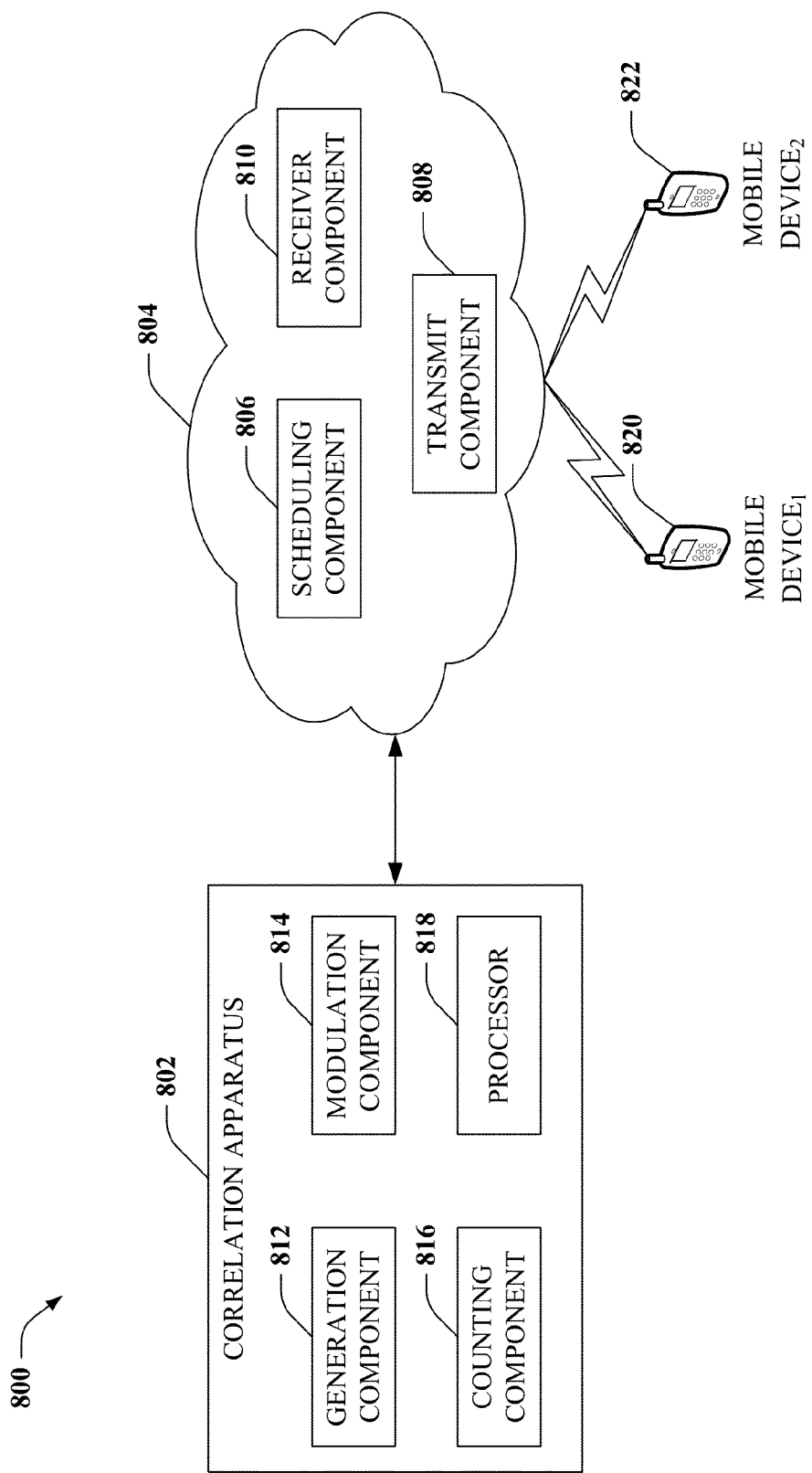
FIG. 8 depicts an exemplary system that facilitates providing feedback to a long term evolution (LTE) network in accordance with aspects set forth herein.

FIG. 8 depicts an exemplary system 800 that facilitates providing feedback to a LTE network in accordance with aspects set forth herein. System 800 can include a correlation apparatus 802 in conjunction with a communication network, such as an LTE network providing multicast or broadcast services. Moreover, the correlation apparatus can assist the network 804 in providing feedback mechanisms related to un-received data. As a result, the network 804 can determine what data should be retransmitted to terminal devices (820, 822) to bolster perceived integrity of provided services.

Network 804 can include a scheduling component 806 that can correlate a block of downlink transmission resources and a block of uplink transmission resources for a multicast or broadcast service, scheduled for transmission during an allocation period. In addition, the correlation can indicate to one or more terminal devices 820, 822 what uplink resource to use to inform a network (e.g., via a NACK message or the like) that the block of downlink transmission resources was missed. In addition, scheduling component 806 can schedule a correlation between additional blocks of uplink transmission resources and the downlink block as a mechanism to indicate a number of devices (820, 822 e.g., by providing a plurality of feedback messages to a network) that require retransmission of the downlink block, as described herein. Additionally, the scheduling component 806 can correlate a plurality of blocks of downlink resources to an uplink resource, to facilitate reporting multiple missed downlink blocks via a single feedback message (e.g., utilizing a bitmap or like technique as described supra).

It should be appreciated that the correlation between the uplink and downlink resources can be a static and/or a dynamic correlation, as suitable. For instance, a function 'F( )' can be utilized to identify one or more uplink blocks 'F(x)' to be utilized for providing feedback related to one or more downlink blocks 'x'. In addition, a dynamic correlation can include providing a correlation to an uplink resource for each block of downlink resources, which is transmitted with the resource, or transmitted with an associated resource, for instance. Alternatively, such dynamic correlation can include a mapping of downlink and uplink resources for each block of downlink transmission resources identified within an allocation period. Such mapping can be transmitted at the outset of the allocation period, along with the service scheduling information for that allocation period.

Network 804 can also include a transmit component 808 that can broadcast scheduled correlation information, e.g., via a multicast or broadcast service, to a plurality of terminal devices (820, 822). In addition, transmit component 808 can execute transmission of data scheduled within an allocation period (e.g., by way of radio frequency transmission, microwave frequency transmission, or via a wired connection between one or more networks, devices, or the like). Transmit component 808 can also retransmit data to such terminal devices (820, 822) as required, for instance, as a result of a feedback message indicating data has been un-received.

Additionally, network 804 can include a receiver component 810, which can receive one or more feedback messages related to one or more blocks of downlink transmission resources from at least one of a plurality of terminal devices (820, 822). For instance, the feedback message can be received via a particular uplink resource correlated with the one or more downlink transmission resources by scheduling component 806. Furthermore, the receiver component 810 can receive a bitmap or other digital information utilized to provide feedback related to a plurality of downlink resources with a single uplink transmission.

In addition to the functions provided by network 804 and its components (806, 808, 810), various other functions can be provided by way of correlation apparatus 802 to facilitate providing feedback to the network. For instance, generation component 812 can provide a probability factor that can limit a number of devices (820, 822) reporting a block of downlink transmission resources. More specifically, the probability factor can be transmitted by transmit component 808, and can require that each terminal device (820, 822) generate a random number before providing feedback related to an un-received downlink block. In such a manner, correlation apparatus can assist network 804 in reducing feedback interference. Moreover, generation component 812 can formulate a hash function that indicates specific uplink resources to be used, where suitable, by specific terminal devices (820, 822). For instance, the hash function can identify a particular uplink resource for a terminal device (820, 822) based at least in part on an access class of a terminal device (820, 822), a hash of each terminal (820, 822) identity, an identity of a service utilized by a terminal (820, 822), or block-specific information, or a combination thereof. The hash function can reduce a likelihood that multiple terminal devices (820, 822) will attempt to compete for a particular uplink resource to provide feedback for missed data.

Correlation apparatus 802 can also comprise a modulation component 814 that can demodulate feedback data to determine, e.g., which of a plurality of blocks of downlink transmission resources were un-received or indecipherable by one of a plurality of terminal devices (820, 822). More specifically, the modulation component 814 can extract a message from multiplexed data and/or a carrier wave/information used to transmit the message. The modulation component 814 enables use of resource specific feedback (e.g., the bitmap described above) to describe un-received resources, as opposed to merely detecting an energy level above a baseline in an uplink channel corresponding to an un-received resource.

Correlation apparatus can further include a counting component 816 that can determine a number of received feedback messages related to a block of downlink transmission resources. Such determination (e.g., in conjunction with the correlation of a plurality of uplink channels to a downlink channel provided by scheduling component 806, as described above), can identify which of multiple un-received resources should be transmitted first. In addition, correlation apparatus 802 can employ a processor 818 to reference a set of network provider rules (e.g., contained in memory, not depicted) and elect between retransmitting one or more blocks of downlink transmission resources based at least in part on the number of received feedback messages related to the blocks of downlink resources, provided by the counting component 816. Accordingly, data un-received by a larger number of devices (820, 822) can be transmitted first, or transmitted in lieu of other data if retransmission bandwidth is limited.

Figure 9:
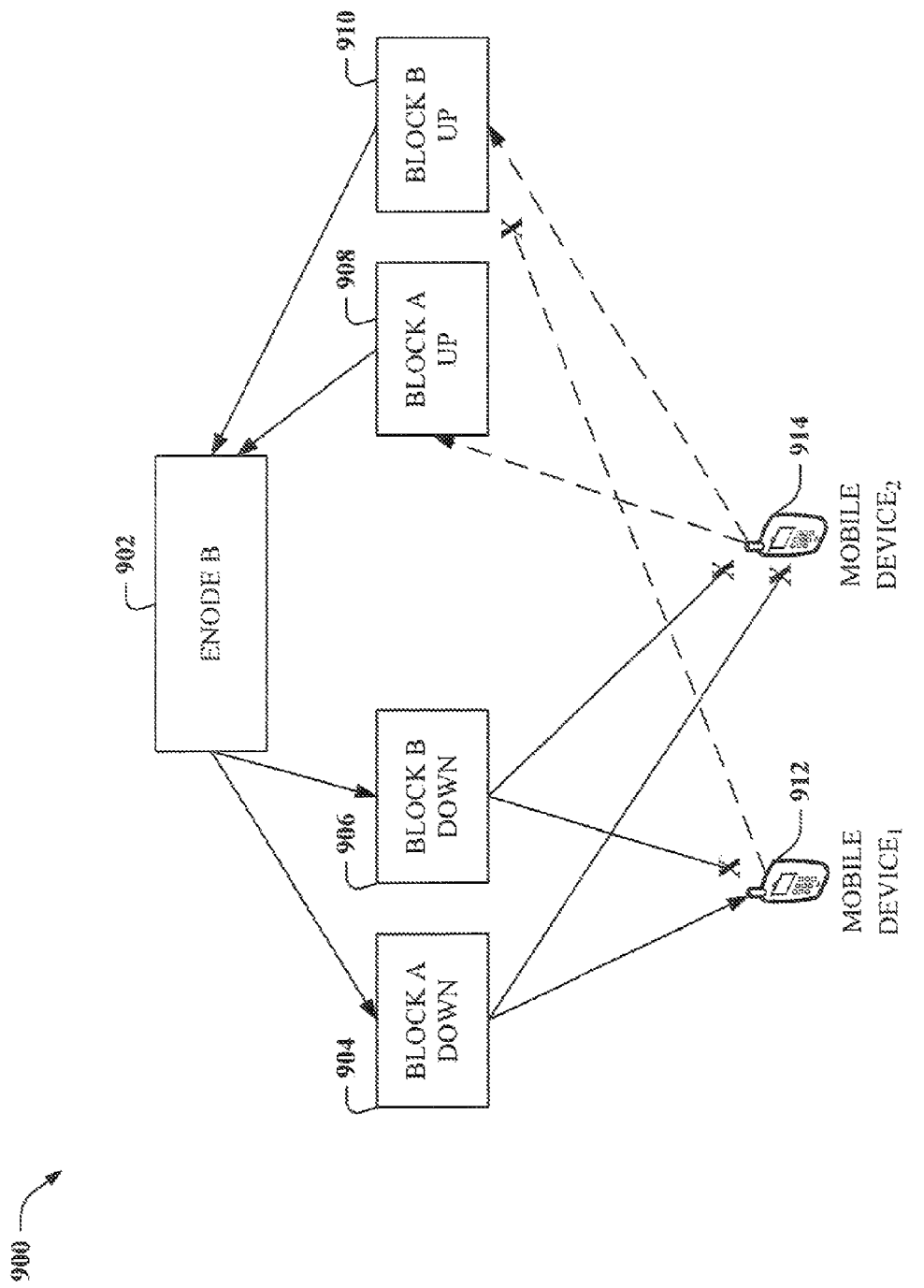
FIG. 9 illustrates an example of providing feedback related to missed transmission in accord with aspects disclosed herein.

FIG. 9 illustrates an example 900 of providing feedback related to missed transmission in accord with aspects disclosed herein. Enode B 902 can transmit one or more blocks of information, for example, within downlink block A 904 and downlink block B 906. Additionally, each block (904, 906) can be transmitted to a plurality of terminal devices (912, 914). As depicted by example 900, device 912 receives downlink block A 904, but not downlink block B 906. Additionally, device 914 receives neither downlink block A 904 nor downlink block B 906.

Utilizing various mechanisms described herein, such devices (912, 914) can provide feedback to eNode B 902 related to any missed blocks of data (904, 906). Specifically, uplink block A 908 can facilitate feedback related to downlink block A 904, and uplink block B 910 can facilitate feedback related to downlink block B 906. Such feedback can be forwarded to eNode B 902 to apprise a network of a need to retransmit missed data.

In accord with particular embodiments disclosed herein, the uplink blocks (908, 910) can be limited in bandwidth, such that only one (or, e.g., another finite number) of feedback messages can be sent. As depicted, downlink block B 906 has not reached either device (912, 914), and consequently both devices (912, 914) have attempted to send feedback related to downlink block B 906. In this case, uplink block B 910 can only carry a single feedback message (e.g., provided by device 914 and relayed to eNode B 902 by uplink block B 910, as depicted), so a second message (e.g., transmitted by device 912) is lost. Consequently, various embodiments disclosed herein can provide multiple uplink blocks (not depicted) for each downlink block (904, 906), so that an indication of a number of failed transmissions can be provided to eNode B 902.

For instance, if uplink block B 910 includes two uplink channels, sufficient to carry one feedback message each, both feedback messages provided by devices (912, 914) can be transmitted to eNode B 902. Consequently, an associated network can determine that downlink block B 906 has a greater need of retransmission in the case of limited retransmission bandwidth. By determining what services are in greater need of retransmission, a network can allocate resources according to such need and provide a greater degree of reliability for network services.

Figure 10:
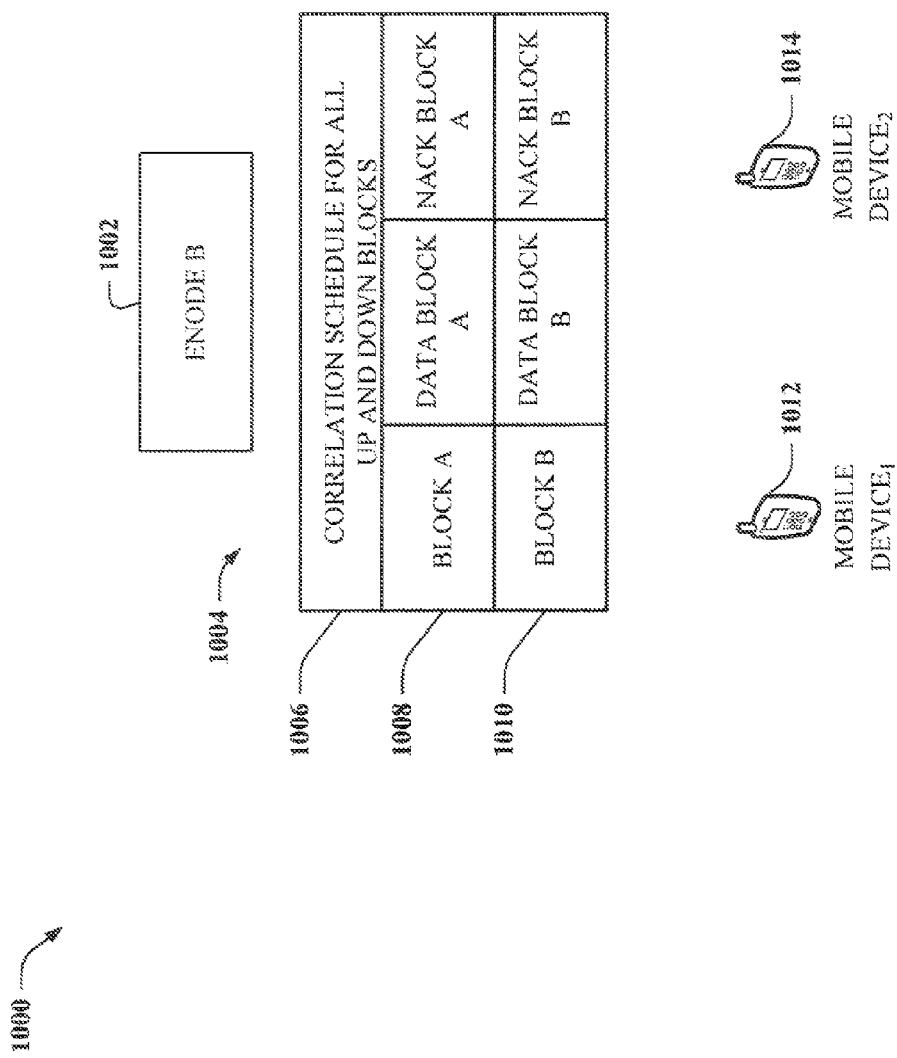
FIG. 10 illustrates an example of providing scheduled correlation of uplink and downlink transmission resources.

FIG. 10 illustrates an example 1000 of providing scheduled correlation of uplink and downlink transmission resources. Such a mechanism can be a more robust way of providing dynamic correlation for downlink blocks of transmission resources of a particular allocation period 1004. More specifically, association between data blocks of an allocation period and feedback resources can be delivered as part of general scheduling information that indicates which service occupies which downlink resource during an upcoming scheduling period. Example 1000 includes an eNode B that can provide access to a communication network for one or more mobile devices 1012, 1014. Additionally, the eNode B 1002 can transmit general scheduling information 1006 as part of an allocation period 1004, as described above. Such general scheduling can inform the mobile devices 1012, 1014 which parts of an allocation period include data related to services utilized by such devices (1012, 1014). Also, a sub-frame 1006 can be dedicated to a correlation schedule that associates all suitable uplink and downlink blocks of transmission resources.

The allocation period 1004 can include, in addition to the scheduling and correlation information 1006, each block 1008, 1010, or sub-frame of the allocation period, and the data associated with that block 1008, 1010, and the corresponding feedback (e.g., NACK information) for that block. If data block A is un-received, for instance, a device (1012, 1014) can consult the schedule 1006 to identify a particular uplink block (e.g., NACK block A) with which to transmit feedback information to eNode B 902. Consequently, as long as scheduling information is received by the devices (1012, 1014), an uplink resource can be identified for any missed block of data. Example 1000 can be applied to various embodiments described herein that provide feedback related to LTE network broadcasts to ensure robust transmission of network services.

Figure 11:
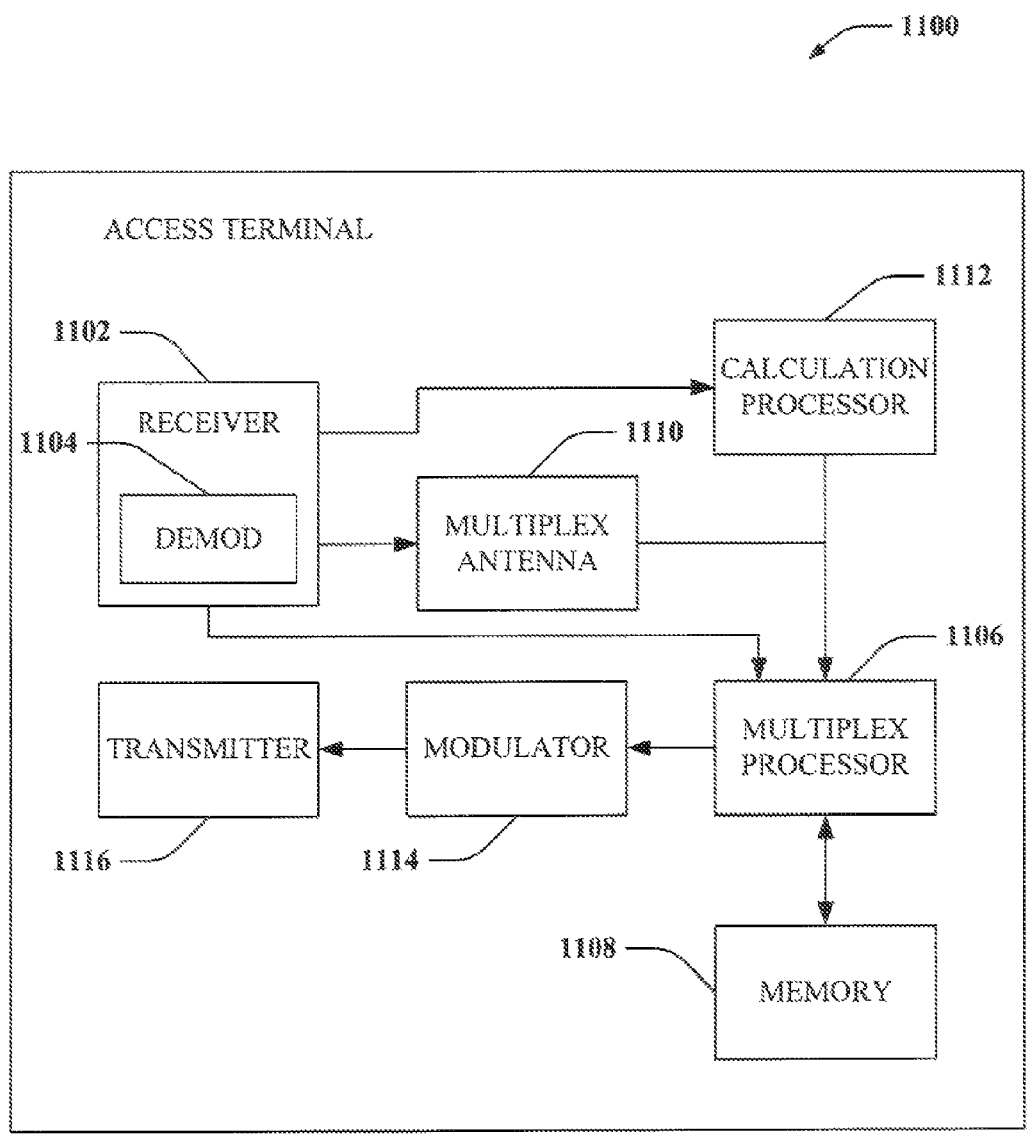
FIG. 11 depicts an exemplary access terminal that can provide feedback to communications networks.

FIG. 11 depicts an exemplary access terminal 1100 that can provide feedback to communications networks, in accordance with one or more aspects. Access terminal 1100 comprises a receiver 1102 (e.g., an antenna) that receives a signal and performs typical actions on (e.g., filters, amplifies, down-converts, etc.) the received signal. Specifically, receiver 1102 can also receive a service schedule defining services apportioned to one or more blocks of a transmission allocation period, a schedule correlating a block of downlink resources with a block of uplink resources for providing feedback information as described herein, or the like. Receiver 1102 can comprise a demodulator 1104 that can demodulate received symbols and provide them to a processor 1106 for evaluation. Processor 1106 can be a processor dedicated to analyzing information received by receiver 1102 and/or generating information for transmission by a transmitter 1116. Additionally, processor 1106 can be a processor that controls one or more components of access terminal 1100, and/or a processor that analyzes information received by receiver 1102, generates information for transmission by transmitter 1116, and controls one or more components of access terminal 1100. Additionally, processor 1106 can execute instructions for interpreting a correlation of uplink and downlink resources received by receiver 1102, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 1100 can additionally comprise memory 1108 that is operatively coupled to processor 1106 and that may store data to be transmitted, received, and the like. Memory 1108 may store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to multiplex antenna 1110 that can receive a scheduled correlation between one or more additional blocks of downlink transmission resources and a block of uplink transmission resources (e.g., to facilitate providing multiple NACK or ACK messages in a bitmap response). A multiplex processor 1106 can include a multi-digit bitmap within a feedback message that provides an ACK or NACK message indicating whether a first downlink block and each of one or more additional downlink blocks are received or un-received, over a single uplink resource. Further, a calculation processor 1112 can receive a feedback probability function, wherein the function limits a probability that a feedback message is provided by access terminal 1100, as described herein, if the block of downlink transmission resources, or data associated therewith, is not received. Specifically, such probability function can be employed to reduce interference if multiple devices are reporting lost data simultaneously.

Access terminal 1100 still further comprises a modulator 1114 and a transmitter 1116 that transmits the signal to, for instance, a base station, an access point, another access terminal, a remote agent, etc. Although depicted as being separate from the processor 1106, it is to be appreciated that signal generator 1110 and indicator evaluator 1112 may be part of processor 1106 or a number of processors (not shown).

Figure 12:
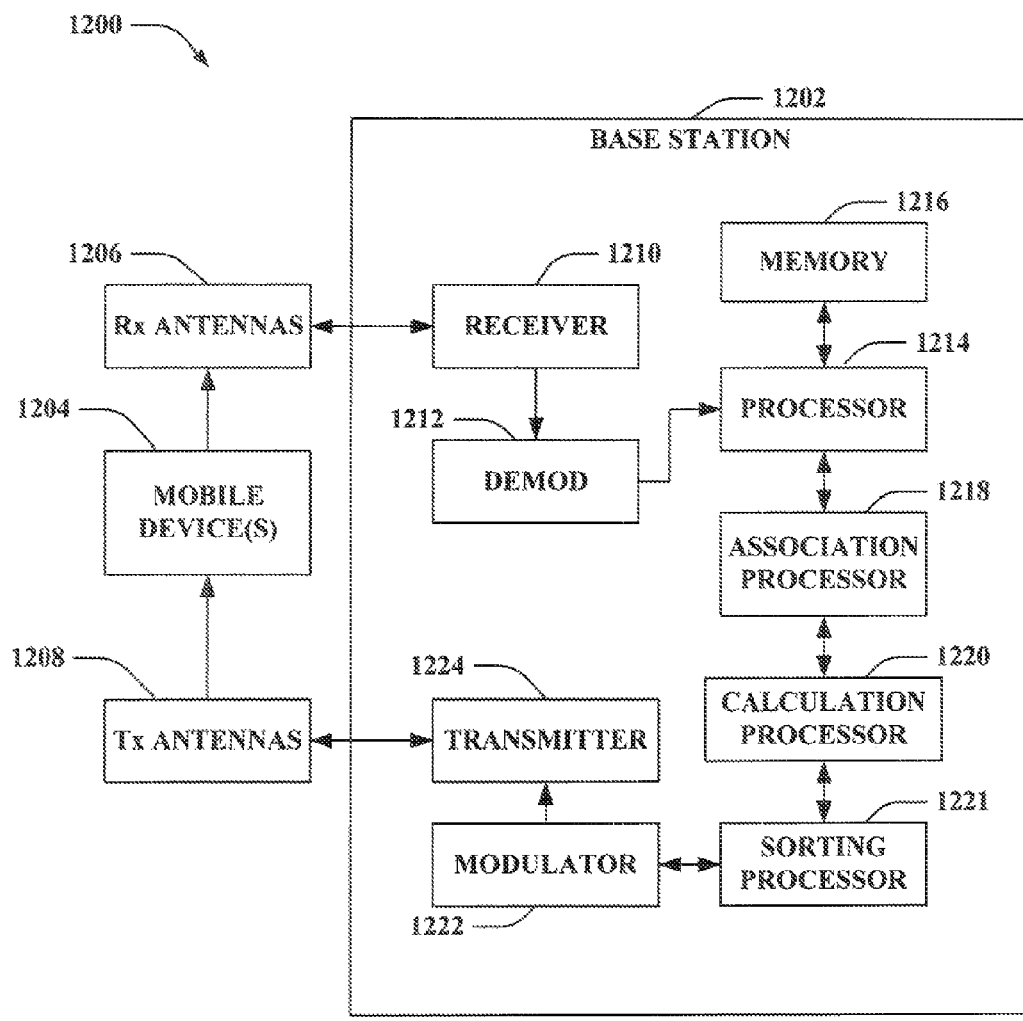
FIG. 12 illustrates an exemplary base station that can be employed in conjunction with a wireless networking environment disclosed herein.

FIG. 12 is an illustration of a system 1200 that facilitates provision of feedback related to lost transmission data for an LTE network. System 1200 comprises a base station 1202 (e.g., access point, . . . ) with a receiver 1210 that receives signal(s) from one or more mobile devices 1204 through a plurality of receive antennas 1206, a modulator 1222, and a transmitter 1224 that transmits to the one or more mobile devices 1204 through a transmit antenna 1208. Receiver 1210 can receive information from receive antennas 1206 and can further comprise a signal recipient (not shown) that receives feedback data related to an un-received or indecipherable data packet. Additionally, receiver 1210 is operatively associated with a demodulator 1212 that demodulates received information. Demodulated symbols are analyzed by a processor 1214 that is coupled to a memory 1216 that stores information related to correlating uplink and downlink resources, providing dynamic and/or static correlations from a network, as well as data to be transmitted to or received from mobile device(s) 1204 (or a disparate base station (not shown)), and/or any other suitable information related to performing the various actions and functions set forth herein.

Processor 1214 is further coupled to an association processor 1218 that can schedule a correlation during an allocation period between a block of downlink transmission resources and a block of uplink transmission resources for a multicast or broadcast service. Additionally, association processor 1218 can further schedule a correlation between one or more additional blocks of uplink transmission resources and the block of downlink transmission resources, to enable receipt of a plurality of feedback messages for the downlink resource. As a result, a relative number of feedback messages related to the downlink resource can be determined. Moreover, association processor 1218 can schedule a correlation between a plurality of blocks of downlink transmission resources and an uplink transmission resource for a multicast or broadcast service, such that a single bitmap included within a feedback message can indicate ACK or NACK information for the plurality of blocks of downlink transmission resources.

Association processor 1218 can be coupled to a calculation processor 1220 that generates a probability factor, which can limit a likelihood that a terminal device will provide the feedback message. The probability factor can be employed by base station 1202 to reduce feedback interference from multiple terminal devices. Additionally, calculation processor 1220 can generate a hash function transmitted by base station 1202 that can indicate to each of a plurality of terminal devices a particular uplink transmission resource to use in submitting a feedback message. The hash function indication can be based at least in part on an access class of each terminal device, a hash of each terminal identity, an identity of a service utilized by each terminal device, or block-specific information, or a combination thereof.

Additionally, calculation processor 1220 can be coupled to a sorting processor 1221 that can determine a number of received feedback messages related to the block of downlink transmission resources. For instance, if a block of downlink transmission resources is coupled with multiple uplink transmission resources (e.g., by association processor 1218, as described above), two or more feedback messages can be received by base station 1202 for the downlink resource. The sorting processor 1221 can therefore identify what feedback messages correspond to the downlink block, which can indicate a retransmission priority for that downlink block. Furthermore, the sorting processor 1221 can elect between retransmitting multiple blocks of downlink transmission resources based at least in part on the number of received feedback messages related to each block of downlink transmission resources.

Figure 13:
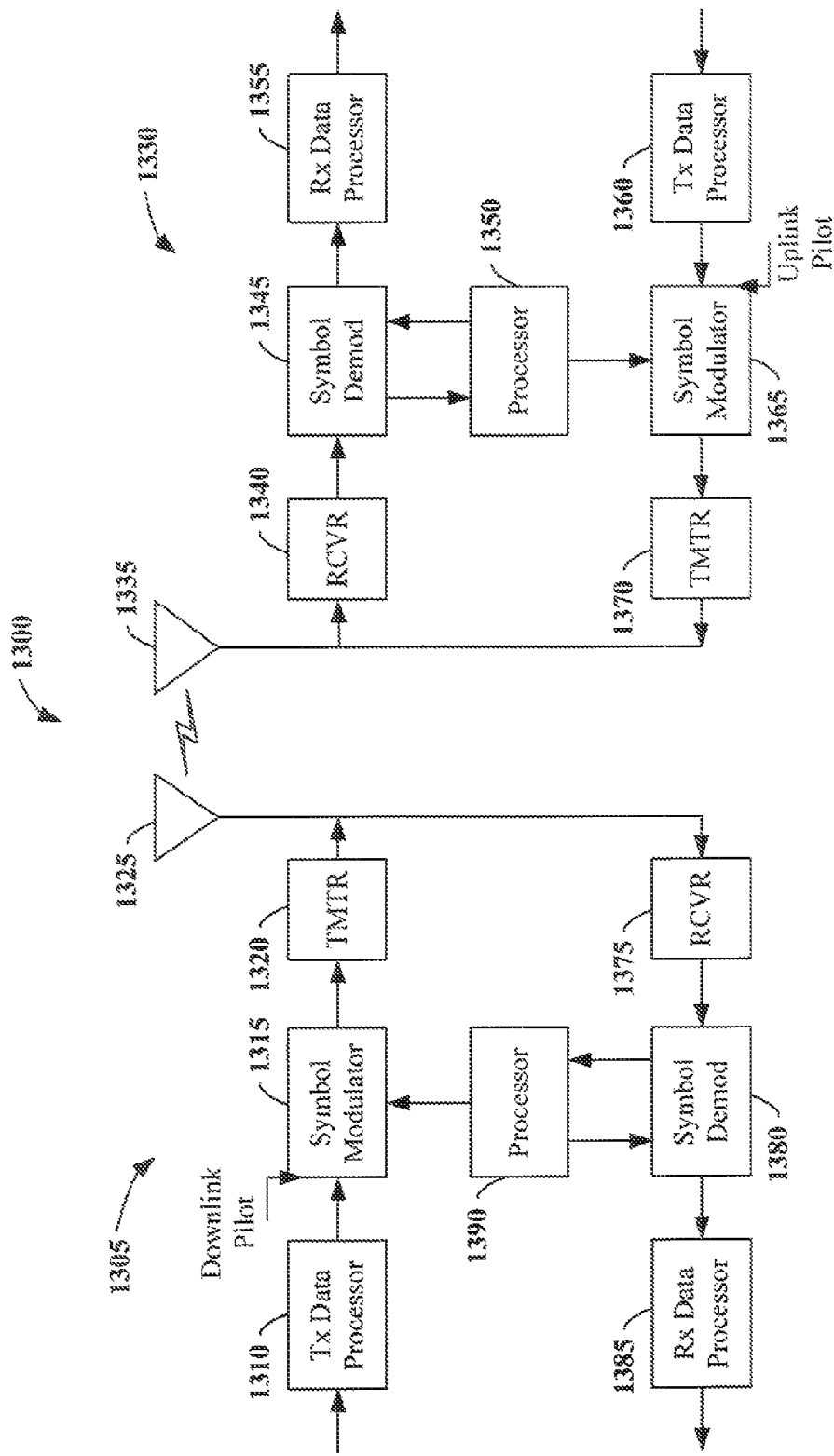
FIG. 13 depicts an exemplary system that facilitates providing feedback to a wireless communication environment in accordance with one or more aspects.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. The symbol modulator 1315 multiplexes data and pilot symbols and provides them to a transmitter unit (TMTR) 1320. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 14:
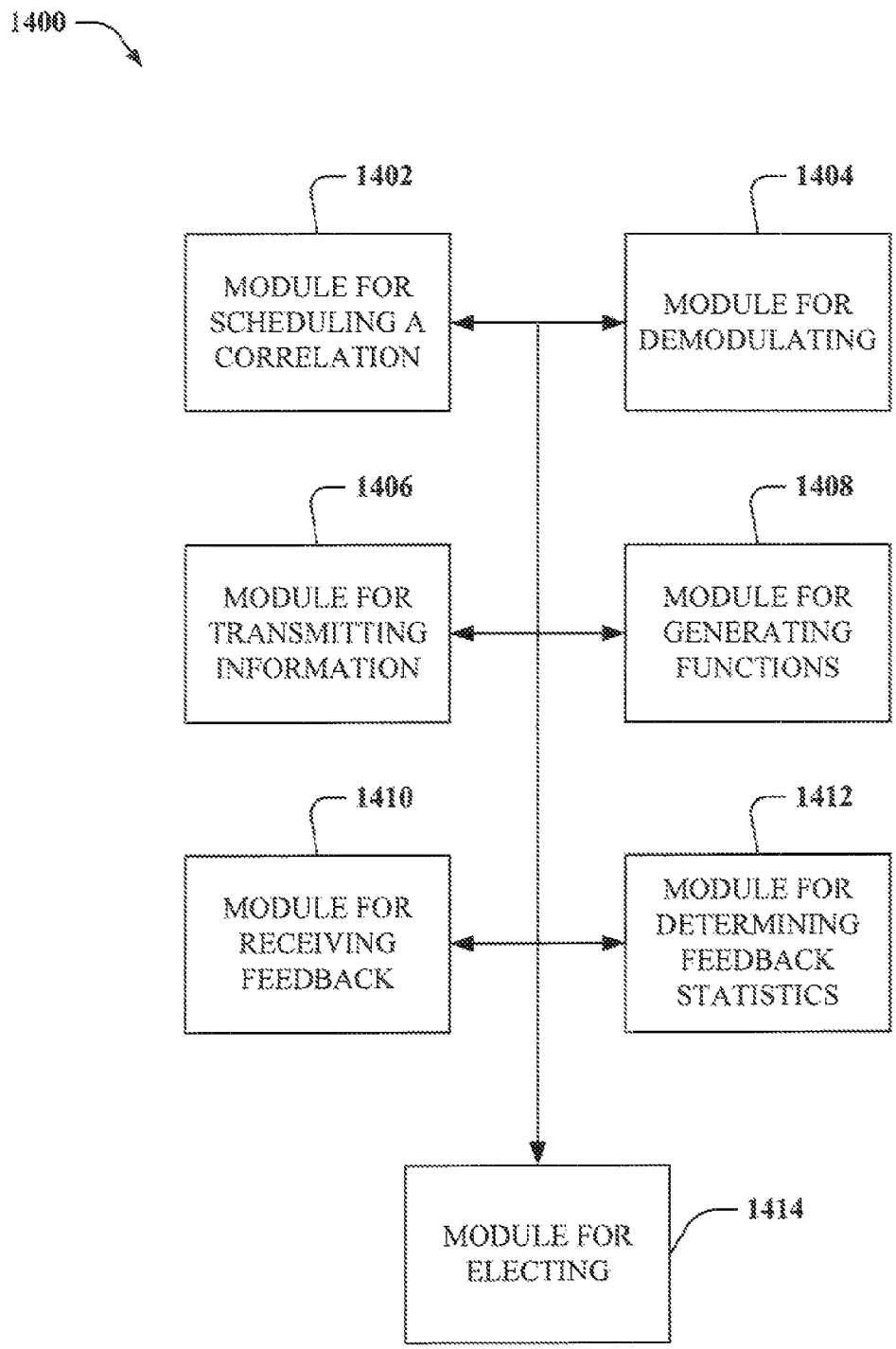
FIG. 14 depicts a system that facilitates provision of feedback to a wireless communication network in accordance with one or more aspects.

With reference to FIG. 14, illustrated is an example system 1400 that facilitates providing feedback related to multicast or broadcast services for an LTE network. For example, system 1400 can reside at least partially within a wireless communication network and/or within a transmitter such as a node, base station, access point, or the like. It is to be appreciated that system 1400 is represented as including functional blocks, which may be functional blocks that represent functions implemented by a processor, software, or combination thereof (e.g., firmware).

System 1400 can include a module for scheduling a correlation 1402, for instance, between uplink and downlink data for a multicast or broadcast data transmitted during an allocation period. Particularly, the module 1402 can schedule a correlation during an allocation period between a block of downlink transmission resources and a block of uplink transmission resources for a multicast or broadcast service. Furthermore, the module 1402 can schedule a correlation between one or more additional blocks of uplink transmission resources and the block of downlink transmission resources, such that the additional blocks of uplink transmission resources enable receipt of a plurality of feedback messages (e.g., indicating a relative number of terminal devices that failed to receive the downlink block of some data transmitted therein).

According to particular aspects of the claimed subject matter, the module 1402 can schedule a correlation between a plurality of blocks of downlink transmission resources and an uplink transmission resource for multicast or broadcast services. As a result, a feedback message (e.g., provided by a terminal device that failed to receive and/or decipher a downlink block and/or data contained therein) can contain a bitmap of ACK or NACK information related to the plurality of blocks of downlink transmission resources. System 1400 can also include a module for demodulating 1404, that can demodulate the bitmap to determine which of a plurality of blocks of downlink transmission resources were un-received or indecipherable by one of a plurality of terminal devices (e.g., which blocks are associated with NACK information).

System 1400 can also include a module for transmitting information 1406. Module 1406 can transmit a scheduled correlation (e.g., provided by module 1402) via a multicast or broadcast service to a plurality of terminal devices. Module 1406 can be responsible for transmitting data/executing transmission of services scheduled for downlink blocks of an allocation period, as well as transmitting scheduled functions and factors (e.g., a hash function or probability factor, see below) that can effectuate additional aspects of the claimed subject matter. Moreover, module 1406 can retransmit blocks of downlink transmission resources, un-received by one or more terminal devices as indicated by one or more feedback message.

In addition to the above, system 1400 can include a module for generating functions 1408. Such a module 1408 can generate a hash function for transmission with a correlation schedule. The hash function can indicate a particular uplink resource to each of a plurality of terminal devices for transmission of feedback messages (e.g., where a plurality of uplink resources is correlated to one, or a related group, of downlink resources). The hash function can indicate the uplink resource based at least in part on an access class of a terminal device, a hash of the terminal device's identity (e.g., subscriber identity module), an identity of a service utilized by the terminal device, or block-specific information, or combinations thereof. In addition, the module 1408 can generate a probability factor that can be utilized to limit a number of terminal devices responding to un-received downlink blocks. For instance, the probability factor can be a number between 0 and 1 (or any suitable range of numbers). A device receiving the probability factor, that also fails to receive a downlink block, can generate a random number between 0 and 1 (or another suitable range), and transmit feedback regarding the un-received block only if the random number is less than (or, e.g., greater than, greater than or equal to, equal to, less than or equal to, or the like) the probability factor.

Additionally, system 1400 can include a module for receiving feedback 1410. For instance, the module 1410 can receive a feedback message related to a block of downlink transmission resources from at least one of a plurality of terminal devices via a block of uplink resources. System 1400 can also include a module for determining feedback statistics 1412, wherein such feedback statistics can be related to the feedback received by the module 1410. For example, the module 1412 can determine a number of received feedback messages related to a block of downlink transmission resources. The number can be utilized to determine a severity of loss of data related to the block of downlink transmission resources. For instance, the greater the number of feedback messages related to that block, the greater a need can be for retransmission of the block.

Furthermore, system 1400 can include a module for electing 1414 between blocks of resources. Such a module can determine which of a plurality of blocks should be apportioned to limited retransmission resources. More particularly, the module for electing 1414 can elect between retransmitting a block of downlink transmission resources or a second block of downlink transmission resources based at least in part on the number of received feedback messages related to the block of downlink transmission resources, on the number of received feedback messages related to the second block, or both.

Figure 15:
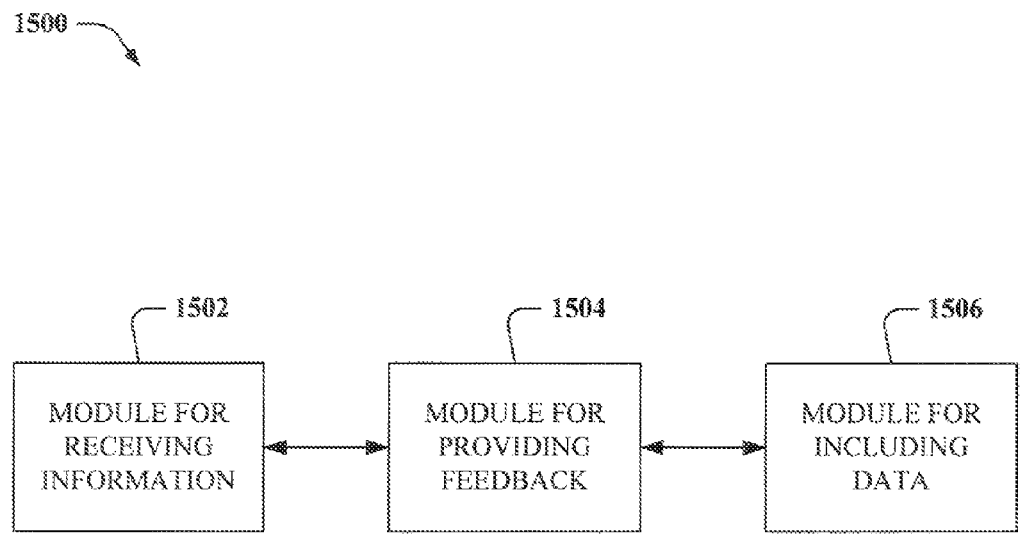
FIG. 15 illustrates a system that can provide feedback to a wireless network in accordance with additional aspects.

With reference to FIG. 15, depicted is an example system 1500 that can provide feedback to an LTE network in accord with one or more aspects. System 1500 may reside at least partially within a mobile device, for instance. As depicted, system 1500 includes functional blocks that may represent functions implemented by a processor, software, or combination thereof (e.g., firmware).

System 1500 can include a module for receiving information 1502, for instance, information transmitted over a wireless link by a wireless communication network. In addition, the module 1502 can receive a transmission service schedule that defines services apportioned to one or more blocks of a transmission allocation period. Further, the module 1502 can receive a scheduled correlation between a block of downlink transmission resources and a block of uplink transmission resources related to a multicast or broadcast service scheduled for the allocation period. A correlation received by module 1502 can also correlate one or more additional blocks of uplink transmission resources and the block of downlink transmission resources, for instance, to facilitate determining a relative number of devices that failed to receive one resource as compared with another. Additionally, module 1502 can receive a feedback probability function that limits a probability that feedback is provided by a terminal device if one or more blocks of downlink transmission resources, or associate data, are not received. According to particular aspects set forth herein, module 1502 can further receive a scheduled correlation between one or more additional blocks of downlink transmission resources and the block of uplink transmission resources, which can enable a device to provide feedback related to multiple downlink blocks via a single feedback message.

In addition to the foregoing, system 1500 can include a module for providing feedback, 1504. Module 1504 can provide a feedback message via a block of uplink transmission resources indicating that at least a portion of a block of downlink transmission resources, or data associated therewith, is not received. Additionally, module 1504 can provide the feedback message either via a random uplink transmission resource or via a particular uplink transmission resource determined at least in part by an identity of a receiving terminal device, a service utilized by the receiving terminal device, an access class of the terminal device, or block-specific information, or combinations thereof (e.g., determine by a hash function). Furthermore, system 1500 can include a module for including data 1506. Such module 1506 can include a multi-digit bitmap within the feedback message (e.g., provided by module for providing feedback 1504) that provides an ACK or NACK message indicating whether a block of downlink transmission resources or one or more additional blocks of downlink transmission resources are received or un-received, respectively, at a device.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing feedback to a wireless multicast or broadcast communication network, comprising:
    scheduling a correlation between a block of downlink transmission resources and a block of uplink transmission resources for an allocation period at least partly associated with a multicast or broadcast service;
    transmitting the scheduled correlation to a plurality of terminal devices;
    transmitting a probability factor along with the scheduled correlation, the probability factor limiting a likelihood that the plurality of terminal devices will transmit a feedback message when the block of downlink transmission resources is not received; and
    receiving a feedback message related to the block of downlink transmission resources from at least one of the plurality of terminal devices via the block of uplink transmission resources.

2. The method of claim 1, comprising scheduling a correlation between one or more additional blocks of uplink transmission resources and the block of downlink transmission resources, the additional blocks of uplink transmission resources enable receipt of a plurality of feedback messages.

3. The method of claim 2, comprising determining a number of received feedback messages related to the block of downlink transmission resources.

4. The method of claim 3, comprising electing to retransmit the block of downlink transmission resources or a second block of downlink transmission resources based at least in part on the number of received feedback messages related to the block of downlink transmission resources.

5. The method of claim 2, comprising generating and transmitting a hash function with the schedule, the hash function indicates to each of the plurality of terminal devices whether to submit a feedback message via the block of uplink transmission resources or one or more of the additional blocks of uplink transmission resources based at least in part on an access class of each terminal device, a hash of each terminal identity, an identity of a service utilized by each terminal device, or block-specific information, or a combination thereof.

6. The method of claim 1, comprising:
    scheduling a correlation between a plurality of blocks of downlink transmission resources and the uplink transmission resource for the multicast or broadcast service, wherein the feedback message contains a bitmap of acknowledgement (ACK) or negative acknowledgement (NACK) information related to the plurality of blocks of downlink transmission resources; and
    demodulating the bitmap to determine which of the plurality of blocks of downlink transmission resources were un-received or indecipherable by one of the plurality of terminal devices.

7. The method of claim 1, wherein at least a portion of the feedback message contains a NACK indicating that the block of downlink transmission resources was un-received or indecipherable.

8. The method of claim 1, wherein the feedback message comprises a non baseline amount of energy within the block of uplink transmission resources that is correlated with the block of downlink transmission resources, the non baseline amount of energy indicates that the block of downlink transmission resources was un-received or indecipherable by the at least one of the plurality of terminal devices.

9. The method of claim 1, wherein the correlation between the block of downlink transmission resources and the block of uplink transmission resources is a static correlation.

10. The method of claim 9, wherein the static correlation comprises a function, the function determines a particular block of uplink transmission resources 'F(x)' to be utilized for sending the feedback message if such message is related to a particular block of downlink transmission resources 'x'.

11. The method of claim 10, wherein the function is transmitted with the schedule or is predetermined and known by the at least one of the plurality of terminal devices and at least one enhanced Node (eNode) base station (B).

12. The method of claim 1, wherein the correlation between the block of downlink transmission resources and the block of uplink transmission resources is a dynamic correlation that is signaled explicitly during the allocation period.

13. The method of claim 12, wherein the dynamic correlation comprises transmitting the scheduled correlation to the plurality of terminal devices along with the block of downlink transmission resources.

14. The method of claim 12, wherein the dynamic correlation comprises transmitting the scheduled correlation to the plurality of terminal devices along with a second block of downlink transmission resources.

15. The method of claim 12, wherein the dynamic correlation comprises transmitting the scheduled correlation during an initial portion of an allocation period that includes the block of downlink transmission resources.

16. The method of claim 1, comprising transmitting data contained within the block of downlink transmission resources.

17. An apparatus that provides feedback for a multicast or broadcast wireless network, comprising:
 means for scheduling a correlation during an allocation period between a block of downlink transmission resources and a block of uplink transmission resources for a multicast or broadcast service;
 means for transmitting the scheduled correlation via the multicast or broadcast service to a plurality of terminal devices;
 means for transmitting a probability factor that limits a likelihood that each of the plurality of terminal devices will provide the feedback message; and
 means for receiving a feedback message related to the block of downlink transmission resources from at least one of the plurality of terminal devices via the block of uplink transmission resources.

18. The apparatus of claim 17, comprising means for scheduling a correlation between one or more additional blocks of uplink transmission resources and the block of downlink transmission resources, the additional blocks of uplink transmission resources enable receipt of a plurality of feedback messages.

19. The apparatus of claim 18, comprising means for determining a number of received feedback messages related to the block of downlink transmission resources.

20. The apparatus of claim 19, comprising means for electing between retransmitting the block of downlink transmission resources or a second block of downlink transmission resources based at least in part on the number of received feedback messages related to the block of downlink transmission resources.

21. The apparatus of claim 18, comprising means for generating and transmitting a hash function with the schedule, the hash function indicates to each of the plurality of terminal devices whether to submit a feedback message via the block of uplink transmission resources or one or more of the additional blocks of uplink transmission resources based at least in part on an access class of each terminal device, a hash of each terminal identity, an identity of a service utilized by each terminal device, or block-specific information, or a combination thereof.

22. The apparatus of claim 17, comprising:
 means for scheduling a correlation between a plurality of blocks of downlink transmission resources and the uplink transmission resource for the multicast or broadcast service, wherein the feedback message contains a bitmap of acknowledgement (ACK) or negative acknowledgement (NACK) information related to the plurality of blocks of downlink transmission resources;
 means for demodulating the bitmap to determine which of the plurality of blocks of downlink transmission resources were un-received or indecipherable by one of the plurality of terminal devices; and
 means for retransmitting un-received blocks of downlink transmission resources.

23. The apparatus of claim 17, wherein at least a portion of the feedback message contains a NACK indicating that the block of downlink transmission resources was un-received or indecipherable.

24. The apparatus of claim 17, wherein the feedback message comprises a non baseline amount of energy within the block of uplink transmission resources that is correlated with the block of downlink transmission resources, the non baseline amount of energy indicates that the block of downlink transmission resources was un-received or indecipherable by the at least one of the plurality of terminal devices.

25. The apparatus of claim 17, wherein the correlation between the block of downlink transmission resources and the block of uplink transmission resources is a static correlation.

26. The apparatus of claim 25, wherein the static correlation comprises a function, the function determines a particular block of uplink transmission resources 'F(x)' to be utilized for sending the feedback message if such message is related to a particular block of downlink transmission resources 'x'.

27. The apparatus of claim 26, wherein the function is transmitted with the schedule or is predetermined and known by the at least one of the plurality of terminal devices and at least one eNode B.

28. The apparatus of claim 17, wherein the correlation between the block of downlink transmission resources and the block of uplink transmission resources is a dynamic correlation that is signaled explicitly during the allocation period.

29. The apparatus of claim 28, wherein the dynamic correlation comprises transmitting the scheduled correlation to the plurality of terminal devices along with the block of downlink transmission resources.

30. The apparatus of claim 28, wherein the dynamic correlation comprises transmitting the scheduled correlation to the plurality of terminal devices along with a second block of downlink transmission resources.

31. The apparatus of claim 28, wherein the dynamic correlation comprises transmitting the scheduled correlation during an initial portion of an allocation period that includes the block of downlink transmission resources.

32. The apparatus of claim 17, comprising means for transmitting data contained within the block of downlink transmission resources to the plurality of terminal devices.

33. An apparatus that facilitates transmission of feedback to a wireless multicast or broadcast network, comprising:
 an association processor that schedules a correlation during an allocation period between a block of downlink transmission resources and a block of uplink transmission resources for a multicast or broadcast service;
 a transmitter that broadcasts the scheduled correlation to a plurality of terminal devices;
 a calculation processor that generates a probability factor for limiting a likelihood that each of the plurality of terminal devices will provide the feedback message; and
 an antenna that receives a feedback message related to the block of downlink transmission resources from at least one of the plurality of terminal devices via the block of uplink transmission resources.

34. The apparatus of claim 33, wherein the association processor further schedules a correlation between one or more additional blocks of uplink transmission resources and the block of downlink transmission resources, the additional blocks of uplink transmission resources enable receipt of a plurality of feedback messages.

35. The apparatus of claim 34, comprising a sorting processor that determines a number of received feedback messages related to the block of downlink transmission resources.

36. The apparatus of claim 35, wherein the sorting processor elects between retransmitting the block of downlink transmission resources or a second block of downlink transmission resources based at least in part on the number of received feedback messages related to the block of downlink transmission resources.

37. The apparatus of claim 34, wherein the calculation processor generates and transmits a hash function with the schedule, the hash function indicates to each of the plurality of terminal devices whether to submit a feedback message via the block of uplink transmission resources or one or more of the additional blocks of uplink transmission resources based at least in part on an access class of each terminal device, a hash of each terminal identity, an identity of a service utilized by each terminal device, or block-specific information, or a combination thereof.

38. The apparatus of claim 33, wherein the association processor further schedules a correlation between a plurality of blocks of downlink transmission resources and the uplink transmission resource for the multicast or broadcast service, such that a bitmap included within the feedback message indicates ACK or NACK information related to the plurality of blocks of downlink transmission resources, and wherein the sorting processor demodulates the bitmap to determine which of the plurality of blocks of downlink transmission resources are associated with a NACK.

39. The apparatus of claim 33, wherein at least a portion of the feedback message contains a NACK indicating that the block of downlink transmission resources was un-received or indecipherable.

40. The apparatus of claim 33, wherein the feedback message comprises a non baseline amount of energy within the block of uplink transmission resources that is correlated with the block of downlink transmission resources, the non baseline amount of energy indicates that the block of downlink transmission resources was un-received or indecipherable by the at least one of the plurality of terminal devices.

41. The apparatus of claim 33, wherein the correlation between the block of downlink transmission resources and the block of uplink transmission resources is a static correlation.

42. The apparatus of claim 41, wherein the static correlation comprises a function, the function determines a particular block of uplink transmission resources 'F(x)' to be utilized for sending the feedback message if such message is related to a particular block of downlink transmission resources 'x'.

43. The apparatus of claim 42, wherein the function is transmitted with the schedule or is predetermined and known by the at least one of the plurality of terminal devices and at least one eNode B.

44. The apparatus of claim 33, wherein the correlation between the block of downlink transmission resources and the block of uplink transmission resources is a dynamic correlation that is signaled explicitly during the allocation period.

45. The apparatus of claim 44, wherein the dynamic correlation comprises transmitting the scheduled correlation to the plurality of terminal devices along with the block of downlink transmission resources.

46. The apparatus of claim 44, wherein the dynamic correlation comprises transmitting the scheduled correlation to the plurality of terminal devices along with a second block of downlink transmission resources.

47. The apparatus of claim 44, wherein the dynamic correlation comprises transmitting the scheduled correlation during an initial portion of an allocation period that includes the block of downlink transmission resources.

48. The apparatus of claim 33, wherein the transmitter broadcasts data contained within the block of downlink transmission resources to the plurality of terminal devices.

49. A processor that facilitates feedback to a wireless multicast or broadcast network, comprising:
  means for scheduling a correlation between a block of downlink transmission resources and a block of uplink transmission resources for an allocation period at least partially associated with a multicast or broadcast service;
  means for transmitting the scheduled correlation to a plurality of terminal devices;
  means for generating a probability factor that limits a likelihood that each of the plurality of terminal devices will provide the feedback message; and
  means for receiving a feedback message related to the block of downlink transmission resources from at least one of the plurality of terminal devices via the block of uplink transmission resources.

50. A computer program product for facilitating feedback to a wireless multicast or broadcast network, comprising:
  a non-transitory computer-readable medium comprising codes executable by at least one computer to:
  schedule a correlation between a block of downlink transmission resources and a block of uplink transmission resources for an allocation period at least partially associated with a multicast or broadcast service;
  transmit the scheduled correlation to a plurality of terminal devices;
  generate a probability factor that limits the likelihood that each of the plurality of terminal devices will provide the feedback message;
  receive a feedback message related to the block of downlink transmission resources from at least one of the plurality of terminal devices via the block of uplink transmission resources.

51. A method for providing feedback to a wireless multicast or broadcast communication network, comprising:
  receiving a transmission service schedule that defines services apportioned to one or more blocks of a transmission allocation period;
  receiving a scheduled correlation between a block of downlink transmission resources and a block of uplink transmission resources related to a multicast or broadcast service scheduled for the allocation period;
  receiving a feedback probability function that limits a probability that feedback is provided by a terminal device if the block of downlink transmission resources, or data associated therewith, was not received; and
  transmitting a feedback message using the block of uplink transmission resources indicating that at least a portion of the block of downlink transmission resources, or data associated therewith, is not received.

52. The method of claim 51, comprising:
  receiving a correlation between one or more additional blocks of uplink transmission resources and the block of downlink transmission resources; and
  providing feedback either via a random uplink transmission resource or via a particular uplink transmission resource that is determined at least in part by an identity of a receiving terminal device, a service utilized by the receiving terminal device, an access class of the terminal device, or block-specific information, or combinations thereof.

53. The method of claim 51, wherein the scheduled correlation is received as part of the block of downlink transmission resources.

54. The method of claim 51, wherein the scheduled correlation is received as part of a related block of downlink transmission resources.

55. The method of claim 51, wherein the scheduled correlation is received at the outset of the allocation period, and identifies one or more particular blocks of uplink transmission resources that are correlated to each of a plurality of blocks of downlink transmission resources scheduled for transmission during the allocation period.

56. The method of claim 51, comprising:
  receiving a scheduled correlation between one or more additional blocks of downlink transmission resources and the block of uplink transmission resources; and
  including a multi-digit bitmap within the feedback message that provides an ACK or NACK message indicating whether the block and each of the one or more additional blocks are received or un-received.

57. An apparatus that provides feedback to a wireless multicast or broadcast network, comprising:
  means for receiving a transmission service schedule that defines services apportioned to one or more blocks of a transmission allocation period;
  means for receiving a scheduled correlation between a block of downlink transmission resources and a block of uplink transmission resources related to a multicast or broadcast service scheduled for the allocation period;
  means for receiving a feedback probability function that limits a probability that feedback is provided by a terminal device if the block of downlink transmission resources, or data associated therewith, is not received; and
  means for providing a feedback message via the block of uplink transmission resources indicating that at least a portion of the block of downlink transmission resources, or data associated therewith, is not received.

58. The apparatus of claim 57, comprising:
  means for receiving a correlation between one or more additional blocks of uplink transmission resources and the block of downlink transmission resources; and
  means for providing feedback either via a random uplink transmission resource or via a particular uplink transmission resource that is determined at least in part by an identity of a receiving terminal device, a service utilized by the receiving terminal device, an access class of the terminal device, or block-specific information, or combinations thereof.

59. The apparatus of claim 57, wherein the scheduled correlation is received as part of the block of downlink transmission resources.

60. The apparatus of claim 57, wherein the scheduled correlation is received as part of a related block of downlink transmission resources.

61. The apparatus of claim 57, wherein the scheduled correlation is received at the outset of the allocation period, and identifies one or more particular blocks of uplink transmission resources that are correlated to each of a plurality of blocks of downlink transmission resources scheduled for transmission during the allocation period.

62. The apparatus of claim 57, comprising:
  means for receiving a scheduled correlation between one or more additional blocks of downlink transmission resources and the block of uplink transmission resources; and
  means for including a multi-digit bitmap within the feedback message that provides an ACK or NACK message indicating whether the block and each of the one or more additional blocks are received or un-received.

63. An apparatus for providing feedback to a wireless multicast or broadcast network, comprising:
  an antenna that receives a service schedule defining services apportioned to one or more blocks of a transmission allocation period, and a scheduled correlation between a block of downlink transmission resources and a block of uplink transmission resources related to a multicast or broadcast service scheduled for the allocation period;
  a calculation processor that receives a feedback probability function, wherein the function limits a probability that the feedback message is provided by a terminal device if the block of downlink transmission resources, or data associated therewith, is not received; and
  a transmitter that provides a feedback message via the block of uplink transmission resources to an eNode B, indicating that at least a portion of the block of downlink transmission resources, or data associated therewith is not received.

64. The apparatus of claim 63, wherein the antenna further receives a correlation between one or more additional blocks of uplink transmission resources and the block of downlink transmission resources, and wherein the transmitter provides the feedback message to a random uplink transmission resource or to a particular uplink transmission resource, the particular resource is determined at least in part by an identity of a receiving terminal device, a service utilized by the receiving terminal device, an access class of the terminal device, or block-specific information, or combinations thereof.

65. The apparatus of claim 63, wherein the scheduled correlation is received as part of the block of downlink transmission resources.

66. The apparatus of claim 63, wherein the scheduled correlation is received as part of a related block of downlink transmission resources.

67. The apparatus of claim 63, wherein the scheduled correlation is received at the outset of the allocation period, and identifies one or more particular blocks of uplink transmission resources that are correlated to each of a plurality of blocks of downlink transmission resources scheduled for transmission during the allocation period.

68. The apparatus of claim 63, comprising:
  a multiplex antenna that receives a scheduled correlation between one or more additional blocks of downlink transmission resources and the block of uplink transmission resources; and
  a multiplex processor that includes a multi-digit bitmap within the feedback message that provides an ACK or NACK message indicating whether the block and each of the one or more additional blocks are received or un-received.

69. A processor that provides feedback to a wireless multicast or broadcast communication network, comprising:
  means for receiving a transmission service schedule that defines services apportioned to one or more blocks of a transmission allocation period;
  means for receiving a scheduled correlation between a block of downlink transmission resources and a block of uplink transmission resources related to a multicast or broadcast service scheduled for the allocation period;

means for receiving a feedback probability function, wherein the function limits a probability that the feedback message is provided by a terminal device if the block of downlink transmission resources, or data associated therewith, is not received; and means for providing a feedback message via the block of uplink transmission resources indicating that at least a portion of the block of downlink transmission resources, or data associated therewith, is not received.

70. A computer program product that facilitates providing feedback to a wireless multicast or broadcast network, comprising:

a non-transitory computer-readable medium comprising codes executable by at least one computer to:

receive a transmission service schedule that defines services apportioned to one or more blocks of a transmission allocation period;

receive a scheduled correlation between a block of downlink transmission resources and a block of uplink transmission resources related to a multicast or broadcast service scheduled for the allocation period;

receive a feedback probability function, wherein the function limits a probability that the feedback message is provided by a terminal device if the block of downlink transmission resources, or data associated therewith, is not received; and provide a feedback message via the block of uplink transmission resources indicating that at least a portion of the block of downlink transmission resources, or data associated therewith, is not received.

* * * * *